(12) United States Patent
Omiya et al.

(10) Patent No.: US 9,382,831 B2
(45) Date of Patent: Jul. 5, 2016

(54) HONEYCOMB STRUCTURE

(71) Applicant: NGK INSULATORS, LTD., Nagoya (JP)

(72) Inventors: Yoshimasa Omiya, Nagoya (JP); Yoshiyuki Kasai, Nagoya (JP); Kazumi Mase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 366 days.

(21) Appl. No.: 14/152,160

(22) Filed: Jan. 10, 2014

(65) Prior Publication Data

US 2014/0127085 A1  May 8, 2014

Related U.S. Application Data

(63) Continuation of application No. PCT/JP2012/066892, filed on Jul. 2, 2012.

(30) Foreign Application Priority Data

Jul. 11, 2011  (JP) ................................. 2011-152858

(51) Int. Cl.
| | |
|---|---|
| *F01N 3/28* | (2006.01) |
| *F01N 3/20* | (2006.01) |
| *F01N 3/022* | (2006.01) |
| *B01J 35/04* | (2006.01) |

(52) U.S. Cl.
CPC ............ *F01N 3/2882* (2013.01); *F01N 3/0222* (2013.01); *F01N 3/2013* (2013.01); *F01N 3/2026* (2013.01); *F01N 3/2828* (2013.01); B01J 35/04 (2013.01); F01N 2330/06 (2013.01); Y02T 10/26 (2013.01)

(58) Field of Classification Search
None
See application file for complete search history.

(56) References Cited

U.S. PATENT DOCUMENTS

| | | | |
|---|---|---|---|
| 5,063,029 | A | 11/1991 | Mizuno et al. |
| 5,245,825 | A | 9/1993 | Ohhashi et al. |

(Continued)

FOREIGN PATENT DOCUMENTS

| | | |
|---|---|---|
| JP | 03-295184 A1 | 12/1991 |
| JP | 04-280086 A1 | 10/1992 |

(Continued)

OTHER PUBLICATIONS

International Search Report and Written Opinion dated Jul. 31, 2012.
(Continued)

*Primary Examiner* — Walter D Griffin
*Assistant Examiner* — Jelitza Perez
(74) *Attorney, Agent, or Firm* — Burr & Brown, PLLC

(57) ABSTRACT

A honeycomb structure includes a cylindrical honeycomb structure section having porous partition walls to define and form a plurality of cells, and an outer peripheral wall, and a pair of electrode sections disposed on a side surface of the honeycomb structure section. An electrical resistivity of the honeycomb structure section is from 1 to 200 Ωcm, and each of the pair of electrode sections is constituted of a laminated body of two or more electrode bodies. An area of the electrode body disposed closest to an outer peripheral wall side is larger than an area of the other electrode body, and in a cross section perpendicular to a cell extending direction, a center angle of the electrode body disposed closest to the outer peripheral wall side is larger than a center angle of the other electrode body.

16 Claims, 14 Drawing Sheets

(56) References Cited

U.S. PATENT DOCUMENTS

| | | | |
|---|---|---|---|
| 5,277,937 A | 1/1994 | Bagley et al. | |
| 5,288,975 A | 2/1994 | Kondo | |
| 5,393,499 A | 2/1995 | Bagley et al. | |
| 5,409,668 A | 4/1995 | Bagley et al. | |
| RE35,134 E | 12/1995 | Mizuno et al. | |
| 2003/0134084 A1 | 7/2003 | Ichikawa et al. | |
| 2012/0003420 A1* | 1/2012 | Betsushiyo | C04B 35/573 428/116 |
| 2012/0187109 A1 | 7/2012 | Noguchi et al. | |
| 2013/0036719 A1 | 2/2013 | Noguchi et al. | |
| 2013/0043236 A1 | 2/2013 | Sakashita et al. | |
| 2013/0043237 A1 | 2/2013 | Sakashita et al. | |
| 2013/0270258 A1 | 10/2013 | Kondo et al. | |

FOREIGN PATENT DOCUMENTS

| | | |
|---|---|---|
| JP | 05-115796 A1 | 5/1993 |
| JP | 06-212954 A1 | 8/1994 |
| JP | 08-141408 A1 | 6/1996 |
| JP | 2931362 B2 | 8/1999 |
| JP | 2002-201082 A1 | 7/2002 |
| JP | 4136319 B2 | 8/2008 |
| WO | 2011/043434 A1 | 4/2011 |
| WO | 2011/105567 A1 | 9/2011 |
| WO | 2011/125815 A1 | 10/2011 |
| WO | 2011/125817 A1 | 10/2011 |
| WO | 2012/086815 A1 | 6/2012 |
| WO | 2012/086817 A1 | 6/2012 |

OTHER PUBLICATIONS

Extended European Search Report (Application No. 12811944.3) dated Feb. 3, 2015.

\* cited by examiner

HONEYCOMB STRUCTURE

TECHNICAL FIELD

The present invention relates to a honeycomb structure. More particularly, it relates to a honeycomb structure which is a catalyst carrier and also functions as a heater by application of a voltage thereto.

BACKGROUND ART

Heretofore, a honeycomb structure which is made of cordierite and onto which a catalyst is loaded has been used in treatment of harmful substances in an exhaust gas discharged from a car engine. Moreover, it is also known that a honeycomb structure formed by a sintered silicon carbide body is used in purification of the exhaust gas (e.g., see Patent Document 1).

When the exhaust gas is treated by the catalyst loaded onto the honeycomb structure, it is necessary to raise a temperature of the catalyst to a predetermined temperature. However, at the start of the engine, the catalyst temperature is low, and hence there has been the problem that the exhaust gas is not sufficiently purified.

Therefore, a method has been investigated in which a heater made of a metal is disposed on an upstream side of a honeycomb structure loaded with a catalyst, to raise a temperature of the exhaust gas (e.g., see Patent Document 2).

Moreover, it has been disclosed that a honeycomb structure made of a conductive ceramic material and provided with electrodes at both ends thereof is used as a catalyst carrier with a heater (e.g., see Patent Document 3).

PRIOR ART LIST

Patent Documents

[Patent Document 1] JP 4136319
[Patent Document 2] JP 2931362
[Patent Document 3] JP-A-H08-141408

SUMMARY OF THE INVENTION

Problem to be Solved by the Invention

When such a heater made of a metal as described above is mounted in a car and used, a power source for use in an electric system of the car is used in common. Therefore, for example, the power source of a high voltage of 200 V is used. However, the heater made of the metal has a low electric resistance, and hence when the power source of such a high voltage is used, there has been the problem that a current excessively flows and impairs a power source circuit sometimes.

Moreover, when the heater is made of the metal, a catalyst is not easily loaded thereonto, even if the heater is processed into a honeycomb structure. Therefore, it has been difficult to integrally form the heater and the catalyst.

Furthermore, in a catalyst carrier with a heater in which electrodes are disposed at both ends of a honeycomb structure made of a conductive ceramic material, the electrodes easily deteriorate, and a resistance value rises sometimes. This is because when the catalyst carrier with the heater is mounted in a car and used, the electrodes are directly exposed directly to an exhaust gas.

The present invention has been developed in view of the above-mentioned problems, and there is provided a honeycomb structure which is a catalyst carrier and also suitably functions as a heater by application of a voltage thereto.

Means for Solving the Problem

To solve the above-mentioned problems, according to the present invention, there is provided a honeycomb structure in the following.

[1] A honeycomb structure including a tubular honeycomb structure section having porous partition walls to define and form a plurality of cells extending from one end surface to the other end surface to become through channels of a fluid, and an outer peripheral wall positioned in the outermost periphery, and a pair of electrode sections disposed on a side surface of the honeycomb structure section, wherein an electrical resistivity of the honeycomb structure section is from 1 to 200 $\Omega$cm, each of the pair of electrode sections is formed into a band-like shape extending in a cell extending direction of the honeycomb structure section, each of the pair of electrode sections is constituted of two or more electrode bodies laminated in a diametric direction in a cross section perpendicular to the cell extending direction of the honeycomb structure section, in the cross section perpendicular to the cell extending direction, the one electrode section in the pair of electrode sections is disposed on a side opposite to the other electrode section in the pair of electrode sections via the center of the honeycomb structure section, when in the respective two or more electrode bodies constituting each of the electrode sections in the pair of electrode sections, the electrode body of each electrode section which is disposed closest to a side of the outer peripheral wall is a first electrode body, an area of the first electrode body of each electrode section in the side surface of the honeycomb structure section is larger than an area of the other electrode body in the two or more electrode bodies of each electrode section, and in at least one cross section perpendicular to the cell extending direction, a center angle of the first electrode body of each electrode section is larger than a center angle of the other electrode body in the two or more electrode bodies of each electrode section.

[2] The honeycomb structure according to the above [1], wherein in the at least one cross section perpendicular to the cell extending direction, the center angle of the other electrode body of each electrode section is an angle corresponding to 5 to 950 of the center angle of the first electrode body of each electrode section.

[3] The honeycomb structure according to the above [1] or [2], wherein in a range of 50 to 100% of a length of the pair of electrode sections in the cell extending direction, the center angle of the first electrode body of each electrode section is larger than the center angle of the other electrode body of each electrode section.

[4] The honeycomb structure according to any one of the above [1] to [3], wherein in all the cross sections of the pair of electrode sections in the cell extending direction, the center angle of the first electrode body of each electrode section is larger than the center angle of the other electrode body of each electrode section.

[5] The honeycomb structure according to any one of the above [1] to [4], wherein the electrical resistivity of the other electrode body of each electrode section is a value corresponding to 5 to 100% of the electrical resistivity of the first electrode body of each electrode section.

[6] The honeycomb structure according to any one of the above [1] to [5], wherein a thickness of the other electrode body of each electrode section is a thickness corresponding to 50 to 150% of a thickness of the first electrode body of each electrode section.

Effect of the Invention

In a honeycomb structure of the present invention, an electrical resistivity of a honeycomb structure section is from 1 to 200 Ωcm. Therefore, even when a current is allowed to flow by use of a power source of a high voltage, the current does not excessively flow, and the honeycomb structure can suitably be used as a heater. Moreover, each of a pair of electrode sections is formed into a band-like shape extending in a cell extending direction of the honeycomb structure section. Furthermore, in a cross section perpendicular to the cell extending direction, the one electrode section in the pair of electrode sections is disposed on a side opposite to the other electrode section in the pair of electrode sections via the center of the honeycomb structure section. Therefore, unevenness of a temperature distribution at the application of the voltage can be suppressed. Furthermore, when constitutions (a) and (b) in the following are employed, concentration of heat generation in a specific portion of a side surface of the honeycomb structure section can be suppressed.

(a) Each of the pair of electrode sections is constituted of two or more electrode bodies laminated in a diametric direction in a cross section perpendicular to the cell extending direction of the honeycomb structure section.

(b) In the respective two or more electrode bodies constituting each electrode section in the pair of electrode sections, the electrode body of each electrode section which is disposed closest to an outer peripheral wall side is a first electrode body. At this time, an area of the first electrode body of each electrode section in the side surface of the honeycomb structure section is larger than an area of the other electrode body in the two or more electrode bodies of each electrode section. Furthermore, in at least one cross section perpendicular to the cell extending direction, a center angle of the first electrode body of each electrode section is larger than a center angle of the other electrode body in the two or more electrode bodies of each electrode section.

In this way, according to the honeycomb structure of the present invention, a portion where heat generation is concentrated in the honeycomb structure is scattered, whereby a local temperature rise of the honeycomb structure can be suppressed, and the heat can more evenly be generated in the honeycomb structure. In consequence, generation of cracks in the honeycomb structure can be suppressed.

MODE FOR CARRYING OUT THE INVENTION

Figure 1:
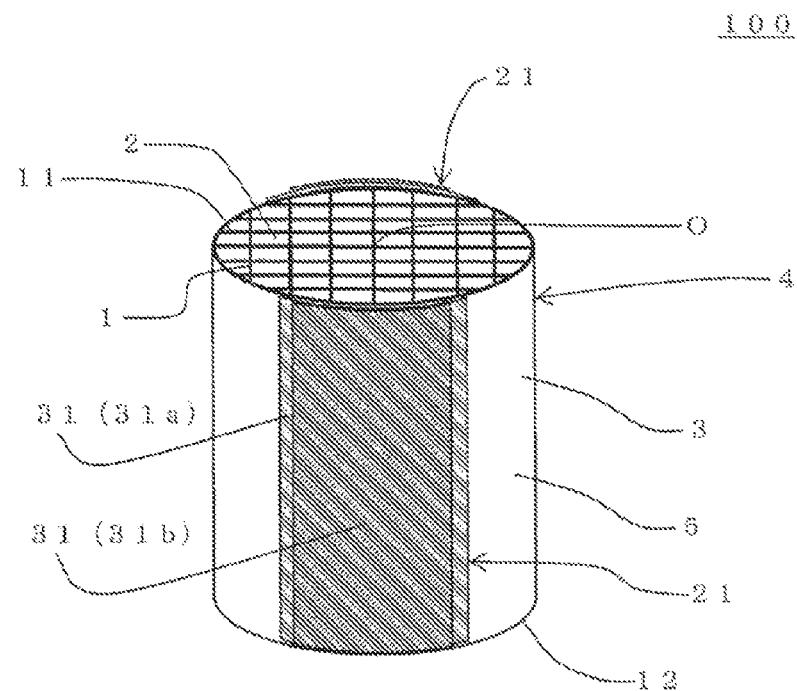
FIG. 1 is a perspective view schematically showing one embodiment of a honeycomb structure of the present invention.

Next, modes for carrying out the present invention will be described in detail with reference to the drawings. It should be understood that the present invention is not limited to embodiments in the following, and design changes, improvements and the like are suitably added on the basis of ordinary knowledge of a person skilled in the art without departing from the gist of the present invention.

(1) Honeycomb Structure:

One embodiment of a honeycomb structure of the present invention is a honeycomb structure 100 including a tubular honeycomb structure section 4, and a pair of electrode sections 21 and 21 disposed on a side surface 5 of the honeycomb structure section 4, as shown in FIG. 1 to FIG. 4. This honeycomb structure section 4 has porous partition walls 1, and an outer peripheral wall 3 positioned in the outermost periphery. The partition walls 1 define and form a plurality of cells 2 extending from one end surface 11 to the other end surface 12 to become through channels of a fluid.

In the honeycomb structure 100 of the present embodiment, an electrical resistivity of the honeycomb structure section 4 is from 1 to 200 Ωcm. Moreover, in the honeycomb structure 100 of the present embodiment, each electrode section 21 in the pair of electrode sections 21 and 21 has a constitution as follows. Hereinafter, the constitution described below will be referred to as "an electrode constitution A" sometimes. Each of the pair of electrode sections 21 and 21 is formed into a band-like shape extending in an extending direction of the cells 2 of the honeycomb structure section 4. Furthermore, each of the pair of electrode sections 21 and 21 is constituted of two or more electrode bodies 31 (two electrode bodies 31a and 31b in FIG. 1 to FIG. 4) laminated in a diametric direction in a cross section perpendicular to the extending direction of the cells 2 of the honeycomb structure section 4. Moreover, in the cross section perpendicular to the extending direction of the cells 2, the one electrode section 21 in the pair of electrode sections 21 and 21 is disposed on a side opposite to the other electrode section 21 in the pair of electrode sections 21 and 21 via a center O of the honeycomb structure section 4.

Furthermore, in the honeycomb structure 100 of the present embodiment, each electrode section 21 of the pair of electrode sections 21 and 21 has a constitution as follows. Hereinafter, the following constitution will be referred to as "an electrode constitution B" sometimes. First, in the respective two or more electrode bodies 31a and 31b constituting each electrode section 21 of the pair of electrode sections 21 and 21, the electrode body 31a of each electrode section which is disposed closest to a side of the outer peripheral wall 3 is "the first electrode body 31a". In this case, an area of the first electrode body 31a of each electrode section in the side surface 5 of the honeycomb structure section 4 is larger than an area of the other electrode body 31b in the two or more electrode bodies 31a and 31b of each electrode section. Moreover, in at least one cross section perpendicular to the extending direction of the cells 2, a center angle α1 of the first electrode body 31a of each electrode section is larger than a center angle α2 of the other electrode body 31b in the two or more electrode bodies 31a and 31b of each electrode section (i.e., α1>α2). "The area of the first electrode body 31a" is "an area of the surface of the first electrode body 31a which comes in contact with the side surface 5 of the honeycomb structure section 4". Moreover, "the area of the other electrode body 31b in the two or more electrode bodies 31a and 31b" is "an area of the surface on a first electrode body 31a side of the other electrode body 31b". "The other electrode body 31b" is "an electrode body other than the first electrode body 31a disposed closest to the outer peripheral wall 3 side".

Figure 2:
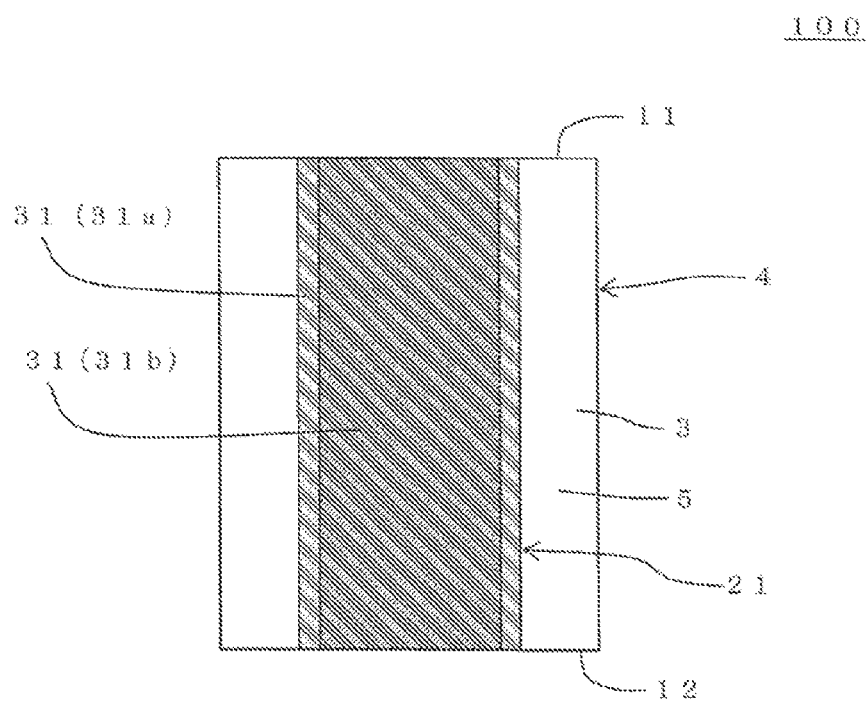
FIG. 2 is a front view schematically showing the one embodiment of the honeycomb structure of the present invention.
Figure 3:
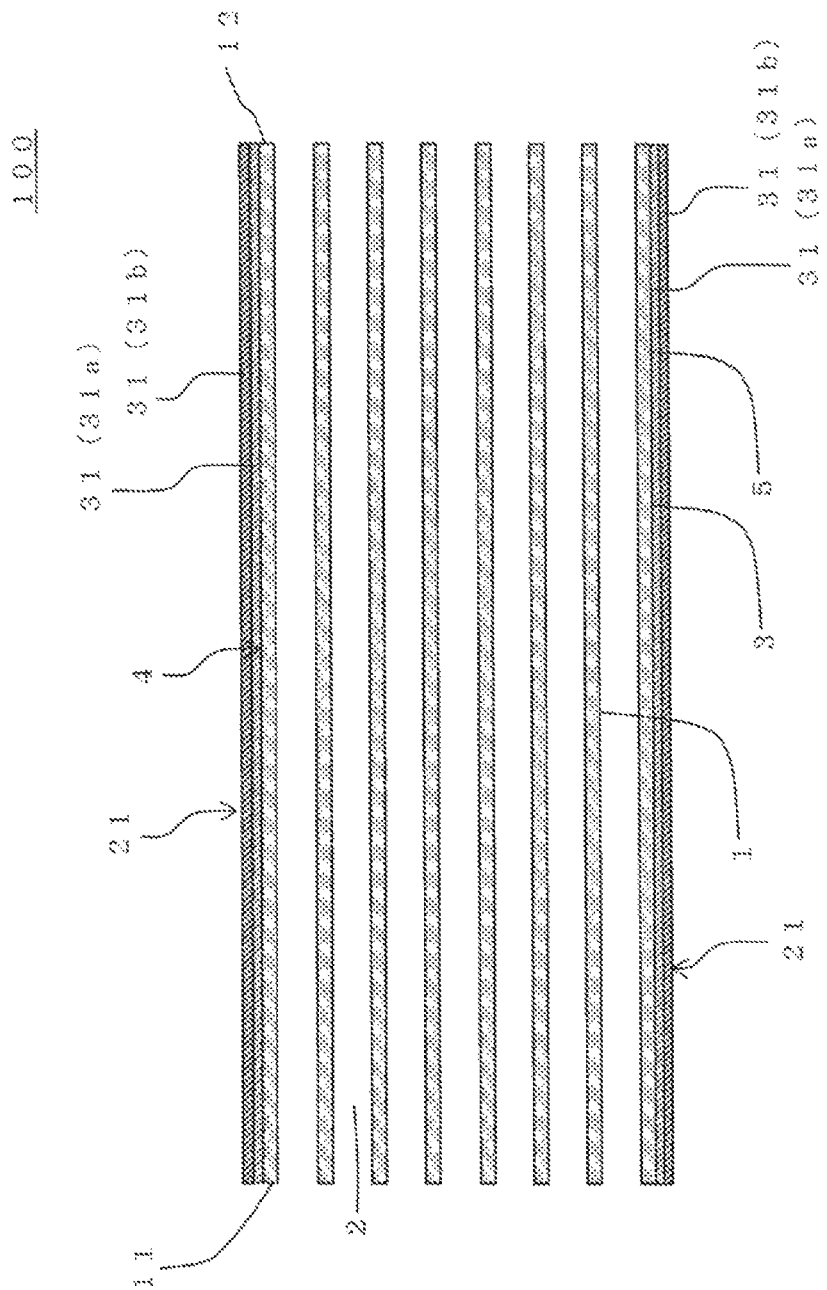
FIG. 3 is a schematic view showing a cross section parallel to a cell extending direction in the one embodiment of the honeycomb structure of the present invention.
Figure 4:
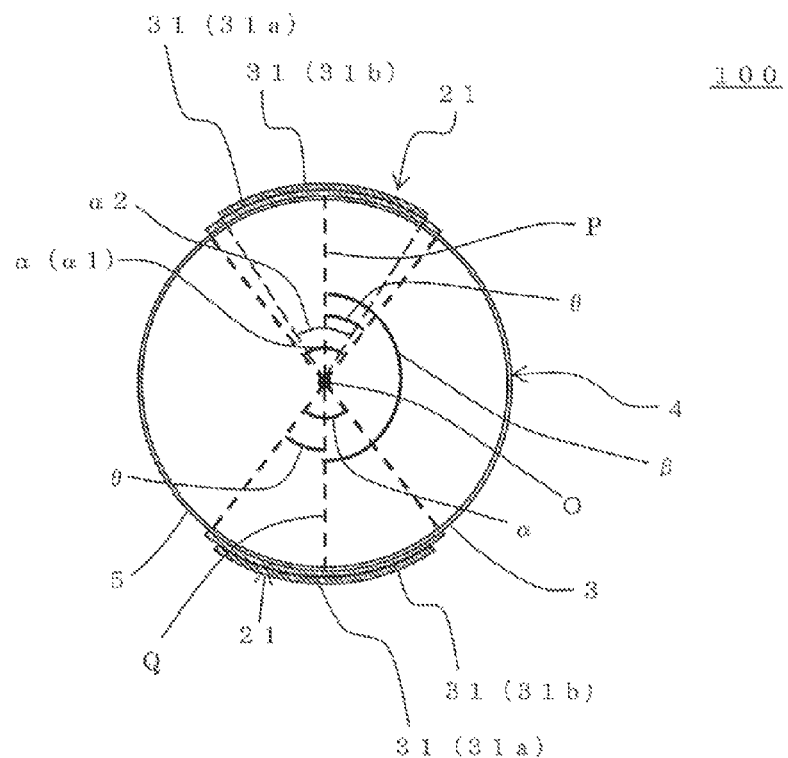
FIG. 4 is a schematic view showing a cross section perpendicular to the cell extending direction in the one embodiment of the honeycomb structure of the present invention.

Here, FIG. 1 is a perspective view schematically showing one embodiment of the honeycomb structure of the present invention. FIG. 2 is a front view schematically showing the one embodiment of the honeycomb structure of the present invention. FIG. 3 is a schematic view showing a cross section parallel to a cell extending direction in the one embodiment of the honeycomb structure of the present invention. FIG. 4 is a schematic view showing a cross section perpendicular to the cell extending direction in the one embodiment of the honeycomb structure of the present invention. In FIG. 4, the partition walls are omitted. Moreover, FIG. 1 to FIG. 4 show an example of a case where each of the pair of electrode sections is constituted of a laminated body in which two electrode bodies are laminated, but each electrode section may be constituted of a laminated body in which three or more electrode bodies are laminated.

In the honeycomb structure 100 of the present embodiment, the electrical resistivity of the honeycomb structure section 4 is from 1 to 200 Ωcm. Therefore, even when a current is allowed to flow by use of a power source of a high voltage, the current does not excessively flow, and the honeycomb structure can suitably be used as a heater. Moreover, in the honeycomb structure 100 of the present embodiment, the above electrode constitution A is employed, and hence it is possible to suppress unevenness of a temperature distribution of the honeycomb structure section 4 when the voltage is applied between the pair of electrode sections 21 and 21.

Furthermore, in the honeycomb structure 100 of the present embodiment, each of the pair of electrode sections 21 and 21 is constituted of two or more electrode bodies 31 laminated in a diametric direction in a cross section perpendicular to the extending direction of the cells 2 of the honeycomb structure section 4. In the honeycomb structure 100 of the present embodiment, each of the pair of electrode sections 21 and 21 is a laminated body of the electrode bodies 31 of two or more layers, whereby the honeycomb structure section 4 can more evenly be heated. For example, when each of the pair of electrode sections 21 and 21 is a conductive film-like section of one layer, the current flows from the vicinities of both side edge portions of each of the pair of electrode sections 21 and 21 toward the honeycomb structure section 4 in a concentrated manner sometimes, in the cross section vertical to the extending direction of the cells 2 of the honeycomb structure 100. When the current flows in the concentrated manner in this way, an amount of heat to be generated in the region increases. When an amount of a power to be supplied to the honeycomb structure 100 is constant and when the specific region is partially heated as described above, the heat generation of the whole honeycomb structure 100 is not sufficiently performed sometimes. That is, when the electrode section is the film-like section of one layer, the unevenness of the temperature distribution partially occurs sometimes, even if the one electrode section 21 and the other electrode section 21 are disposed on the opposite sides via the center O of the honeycomb structure section 4. In particular, when the temperature of the portion where the current flows in the concentrated manner excessively rises as described above, it is predicted that a temperature of another region does not sufficiently rise, and a purification performance (an emission performance) of an exhaust gas of the honeycomb structure 100 deteriorates sometimes.

In the honeycomb structure 100 of the present embodiment, each of the pair of electrode sections 21 and 21 is the laminated body of two or more electrode bodies 31 as described above. Furthermore, in the honeycomb structure 100 of the present embodiment, the above electrode constitution B is employed. "The other electrode body" of the respective two or more electrode bodies 31a and 31b is preferably disposed in a region where "the first electrode body" is disposed. Moreover, when the electrode bodies are three or more layers, the respective electrode bodies are preferably disposed so that the electrode body disposed on an upper layer side is included in a region where "the electrode body disposed on a lower layer side" (i.e., the upper layer side electrode body does not project from the lower layer side electrode body). Hereinafter, the other electrode body disposed on the surface of the first electrode body 31a will be referred to as "the second electrode body 31b" sometimes.

According to such a constitution, the concentrated current flow in each electrode section can be scattered. That is, the electrode section is constituted of the laminated body of two or more electrode bodies having such areas and center angles as described above, whereby the side edge portion of the first electrode body does not match the side edge portion of the other electrode body, and the side edge portions of the respective electrode bodies shift from each other. Therefore, base points where the current flows in the concentrated manner (i.e., the side edge portions of the respective electrode bodies) increase, and the portion where the current is concentrated can be scattered.

For example, in FIG. 1 to FIG. 4, the electrode section 21 is formed of the electrode body 31 of a two-layer structure of the first electrode body 31a and the second electrode body 31b. According to such a constitution, the portion where the current is concentrated can be scattered to four portions in total including the vicinities of both side edge portions of the first electrode body 31a and the vicinities of both side edge portions of the second electrode body 31b. In consequence, the current more evenly flows through the honeycomb structure section 4. For example, the heat can suitably (in other words, efficiently) be generated in the honeycomb structure 100 by a constant amount of power, and a local temperature rise can be suppressed. In consequence, the maximum temperature at the heat generation of the honeycomb structure can be lowered. Moreover, the purification performance (the emission performance) of the exhaust gas of the honeycomb structure 100 can be enhanced.

Here, when "in the cross section perpendicular to the extending direction of the cells 2, the one electrode section 21 in the pair of electrode sections 21 and 21 is disposed on the side opposite to the other electrode section 21 in the pair of electrode sections 21 and 21 via the center O of the honeycomb structure section 4", the following constitution is meant. First, in the cross section perpendicular to the cell extending direction, a line segment connecting a central point of the one electrode section 21 to the center O of the honeycomb structure section 4 is "a line segment P". Moreover, in the cross section perpendicular to the cell extending direction, a line segment connecting a central point of the other electrode section 21 to the center O of the honeycomb structure section 4 is "a line segment Q". The central points of the one electrode section 21 and the other electrode section 21 are points of the center of the honeycomb structure section 4 in a peripheral direction. Moreover, "the opposite sides via the center O of the honeycomb structure section 4" mean such a positional relation that an angle β formed by the line segment P and the line segment Q is in a range of 170° to 190°. Therefore, in the above-mentioned constitution, the pair of electrode sections 21 and 21 are disposed in such a positional relation that the above range of the angle β is satisfied.

In the honeycomb structure 100 of the present embodiment, a material of the partition walls 1 and the outer peripheral wall 3 is preferably a material containing a silicon-silicon carbide composite material or a silicon carbide material as a main component, and is further preferably the silicon-silicon carbide composite material or the silicon carbide material. When "the material of the partition walls 1 and the outer peripheral wall 3 is the material containing the silicon-silicon carbide composite material or the silicon carbide material as the main component", it is meant that the partition walls 1 and the outer peripheral wall 3 contain the silicon-silicon carbide composite material or the silicon carbide material as much as 90 mass % or more of the whole material. By using such a material, the electrical resistivity of the honeycomb structure section can be from 1 to 200 Ωcm. Here, the silicon-silicon carbide composite material contains silicon carbide particles as aggregates, and silicon as a binding agent that binds the silicon carbide particles. In this silicon-silicon carbide composite material, a plurality of silicon carbide particles are preferably bound by silicon so as to form pores among the silicon carbide particles. Moreover, the silicon carbide material is obtained by sintering the silicon carbide particles to one another. The electrical resistivity of the honeycomb structure section is a value at 400° C.

As shown in FIG. 1 to FIG. 4, in the honeycomb structure 100 of the present embodiment, the pair of electrode sections 21 and 21 are disposed on the side surface 5 of the honeycomb structure section 4 (the surface of the outer peripheral wall 3). In the honeycomb structure 100 of the present embodiment, the voltage is applied between the pair of electrode sections 21 and 21, to generate the heat. The voltage to be applied is preferably from 12 to 900 V, and further preferably from 64 to 600 V.

In the honeycomb structure 100 of the present embodiment, each of the pair of electrode sections 21 and 21 is constituted of the two or more electrode bodies 31 laminated in the diametric direction in the cross section perpendicular to the extending direction of the cells 2 of the honeycomb structure section 4 (two layers of the electrode bodies 31a and 31b in FIG. 1 to FIG. 4). Moreover, an area of the first electrode body 31a of each electrode section in the side surface 5 of the honeycomb structure section 4 is larger than an area of the other electrode body 31b in the two or more electrode bodies 31a and 31b of each electrode section. Furthermore, in the at least one cross section perpendicular to the extending direction of the cells 2, the center angle α1 of the first electrode body 31a of each electrode section is larger than the center angle α2 of the other electrode body 31b in the two or more electrode bodies 31a and 31b of each electrode section.

In the honeycomb structure 100 of the present embodiment, in the at least one cross section perpendicular to the extending direction of the cells 2, the center angle of the other electrode body 31b is preferably an angle corresponding to 5 to 95% of the center angle of the first electrode body 31a on which the other electrode body 31b is laminated. According to such a constitution, a sufficient difference is made between a position of the side edge of the first electrode body and a position of the side edge of the other electrode body, the portion where the current flows in the concentrated manner is scattered, and the heat can more evenly be generated in the honeycomb structure. Moreover, by suppressing local heat generation, the purification performance of the exhaust gas can further be enhanced. It is to be noted that the center angle of the other electrode body 31b is more preferably an angle corresponding to 25 to 95%, and especially preferably an angle corresponding to 50 to 90% of the center angle of the first electrode body. Moreover, when the electrode section includes three or more layers and when the electrode section is an n+1 layer structure (n is an integer of 2 or more), a center angle of the n+1st layer is preferably an angle corresponding to 5 to 95% of a center angle of the n-th layer.

In the honeycomb structure 100 of the present embodiment shown in FIG. 1 to FIG. 4, each of the pair of electrode sections 21 and 21 is formed by a laminated body of two electrode bodies of the first electrode body 31a and the second electrode body 31b. In this case, in the cross section perpendicular to the extending direction of the cells 2, the center angle α1 of the first electrode body 31a is preferably from 40 to 140°, further preferably from 60 to 120°, and especially preferably from 80 to 100°. According to such a constitution, when the voltage is applied between the pair of electrode sections 21 and 21, the unevenness of the current flowing through the honeycomb structure section 4 can more effectively be suppressed. In other words, the current flowing through the honeycomb structure section 4 can be allowed to more evenly flow. In consequence, the unevenness of the heat generation in the honeycomb structure section 4 can be suppressed. "The center angle of the electrode body 31 (e.g., the center angle α1 of the first electrode body 31a)" is an angle formed by two line segments connecting both the side edges of the electrode body 31a to the center O of the honeycomb structure section 4 in the cross section perpendicular to the extending direction of the cells 2, as shown in FIG. 4. That is, in the cross section perpendicular to the extending direction of the cells 2, the angle is an inner angle of a portion of the center O in a shape (e.g., a fan shape) formed by "the electrode body 31", "the line segment connecting the one side edge of the electrode body 31 to the center O", and "the line segment connecting the other side edge of the electrode body 31 to the center O".

In the honeycomb structure 100 of the present embodiment, a portion where the center angle α1 of the first electrode body 31a is larger than the center angle α2 of the other electrode body 31b may only be at least one portion in the extending direction of the cells 2 (i.e., at least one cross section perpendicular to the extending direction of the cells 2). However, in a range of 30 to 100% of a length of the pair of electrode sections 21 and 21 in the extending direction of the cells 2, the center angle α1 of the first electrode body 31a of each electrode section is preferably larger than the center angle α2 of the other electrode body 31b of each electrode section. A range in which the center angle α1 of the first electrode body 31a increases is preferably from 60 to 100%, and further preferably from 80 to 100% of the length of the electrode section in the extending direction of the cells 2. Furthermore, in all the cross sections of the pair of electrode sections 21 and 21 which are perpendicular to the extending direction of the cells 2, the center angle α1 of the first electrode body 31a of each electrode section is especially preferably larger than the center angle α2 of the other electrode body 31b of each electrode section. That is, in all the cross sections perpendicular to the cell extending direction, the center angle α1 of the first electrode body 31a of each electrode section is especially preferably larger than the center angle α2 of the other electrode body 31b of each electrode section. A width of each of the electrode bodies 31a and 31b may be constant or may vary in the extending direction of the cells 2. "The width of the electrode body" is a length of the electrode body from one side edge to the side edge, i.e., the length thereof in the peripheral direction of the honeycomb structure section.

Moreover, "an angle θ which is 0.5 time as much as a center angle α" of the one electrode section 21 preferably has a size which is from 0.8 to 1.2 times as much as "the angle θ which is 0.5 time as much as the center angle α" of the other electrode section 21, and further preferably has a size of 1.0 time (i.e., the same size). In consequence, when the voltage is applied between the pair of electrode sections 21 and 21, the unevenness of the current flowing through the honeycomb structure section 4 can more effectively be suppressed, whereby the unevenness of the heat generation in the honeycomb structure section 4 can more effectively be suppressed.

It is to be noted that "the center angle of the one electrode section or the other electrode" is a center angle obtained on the basis of the electrode body in which the center angle is largest in the electrode section.

As shown in FIG. 1 to FIG. 4, each of the electrode sections 21 and 21 of the honeycomb structure 100 of the present embodiment is formed by laminating the two or more electrode bodies 31a and 31b in a state where the electrode bodies are bent along an outer periphery of a cylindrical shape of the honeycomb structure section 4. Here, a shape of the respective bent electrode bodies 31 deformed into a planar member which is not bent will be referred to as "a planar shape" of the respective electrode bodies 31. The respective electrode bodies 31 are, for example, the first electrode body 31a and the second electrode body 31b. "The planar shape" of the first electrode body 31a and the second electrode body 31b shown in FIG. 1 to FIG. 4 is a rectangular shape. Moreover, "the outer peripheral shape of the electrode body" means "the outer peripheral shape in the planar shape of each electrode body". Moreover, "a planar shape" and "an outer peripheral shape" of the electrode section are "the planar shape" and "the outer peripheral shape" of the electrode body of a laminated state, unless otherwise specified. For example, when another electrode body is disposed (laminated) on the first electrode body so that the other electrode body does not project from the first electrode body, "the planar shape" and "the outer peripheral shape" of the electrode section are the same as "the planar shape" and "the outer peripheral shape" of the first electrode body.

The honeycomb structure 100 of the present embodiment shown in FIG. 1 to FIG. 4 shows an example of the case where the outer peripheral shape of the respective electrode bodies 31a and 31b is the rectangular shape. In the honeycomb structure of the present embodiment, when the outer peripheral shape of the electrode section is a shape such as a band-like shape formed so as to extend in the cell extending direction, the outer peripheral shape of each electrode body may be a shape other than the above-mentioned rectangular shape.

Figure 5A:
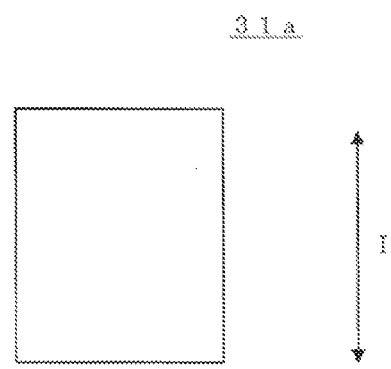
FIG. 5A is a plan view schematically showing one example of a first electrode body.
Figure 5B:
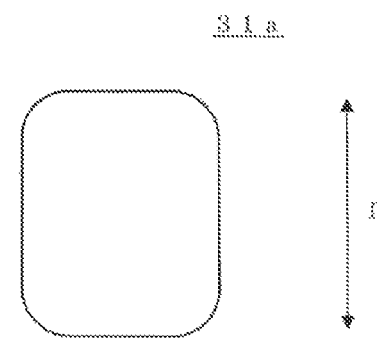
FIG. 5B is a plan view schematically showing another example of the first electrode body.

That is, the outer peripheral shape of the first electrode body 31a is not limited to such "a rectangular shape" as shown in FIG. 5A. The shape may be, for example, such "a shape obtained by curvedly forming corner portions of a rectangular shape" as shown in FIG. 5B. Moreover, the outer peripheral shape of the first electrode body 31a may be "a shape formed by linearly chamfering the corner portions of the rectangular shape". Furthermore, the outer peripheral shape of the first electrode body 31a may be a composite application of "a curved form" and "a linear form". The composite application of "the curved form" and "the linear form" is a rectangular shape in which at least one corner portion has "the curved form" and at least one corner portion has "the linearly chamfered form". Moreover, "the band-like shape" in the present description can be referred to as a sheet-like shape or a film-like shape. That is, "the electrode section" in the present description does not include an outwardly projecting portion such as "an electrode terminal projecting portion" in the present description. FIG. 5A is a plan view schematically showing one example of the first electrode body. FIG. 5B is a plan view schematically showing another example of the first electrode body. Furthermore, character I in FIG. 5A and FIG. 5B indicates the cell extending direction.

In this way, the outer peripheral shape of the first electrode body 31a is "the shape obtained by curvedly forming the corner portions of the rectangular shape" or "the shape formed by linearly chamfering the corner portions of the rectangular shape", which can further enhance a heat shock resistance of the honeycomb structure. For example, when the corner portion of the first electrode body 31a has the right angle, there is a tendency that stress around "the corner portion of the first electrode body" in the honeycomb structure section becomes relatively high as compared with another portion. In contrast, when the corner portions of the first electrode body are curved or linearly chamfered, the stress around "the corner portions of the first electrode body" in the honeycomb structure section can be lowered.

Figure 5C:
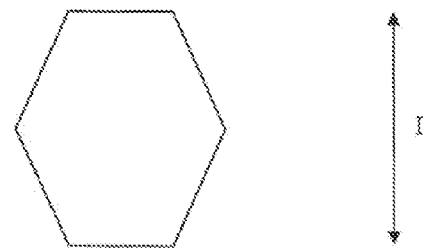
FIG. 5C is a plan view schematically showing still another example of the first electrode body.
Figure 5D:
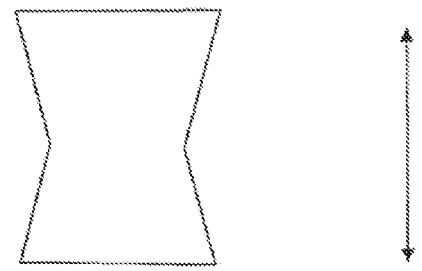
FIG. 5D is a plan view schematically showing a further example of the first electrode body.

Moreover, the outer peripheral shape of the first electrode body 31a may be such "a hexagonal shape" as shown in FIG. 5C and FIG. 5D. In FIG. 5C, as the first electrode body 31a whose outer peripheral shape is the hexagonal shape, there is shown the case of a hexagonal shape in which each inner angle is smaller than 180°. In FIG. 5D, as the first electrode body 31a whose outer peripheral shape is the hexagonal shape, there is shown the case of a hexagonal shape in which inner angles of two facing corners are in excess of 180°. FIG. 5C and FIG. 5D are plan views schematically showing these other examples of the first electrode body.

Figure 5E:
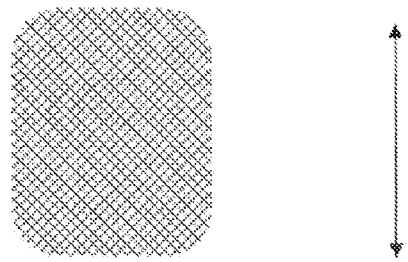
FIG. 5E is a plan view schematically showing a further example of the first electrode body.
Figure 5F:
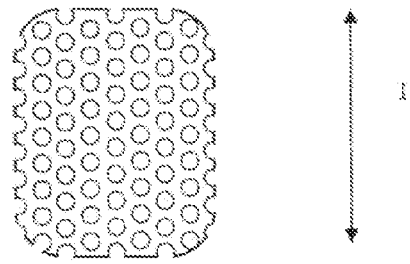
FIG. 5F is a plan view schematically showing a further example of the first electrode body.

Furthermore, the first electrode body 31a may be, for example, such "a net-like (mesh-like)" electrode body as shown in FIG. 5E. The first electrode body 31a shown in FIG. 5E is an electrode body whose outer peripheral shape is "the shape obtained by curvedly forming the corner portions of the rectangular shape", and arranging squares (meshes) of a lattice in a direction oblique to the cell extending direction I. Moreover, the first electrode body 31a may be, for example, an electrode body having such "a shape obtained by forming dot-like voids (pores) in the electrode body" as shown in FIG. 5F.

Figure 5G:
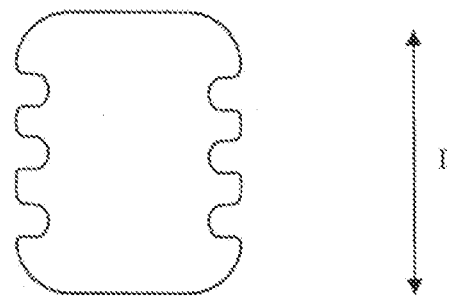
FIG. 5G is a plan view schematically showing a still further example of the first electrode body.

Additionally, the first electrode body 31a may have, for example, "a shape in which a part of a side parallel to the cell extending direction I in sides constituting the outer peripheral shape of the first electrode body is inwardly dented". For example, the first electrode body 31a shown in FIG. 5G shows an example of a case where in the electrode body whose outer peripheral shape is "the shape obtained by curvedly forming the corner portions of the rectangular shape", respective three portions of the side (side edge) parallel to the cell extending direction of the electrode body are cut in a circular form. In other words, the first electrode body 31a shown in FIG. 5G has the shape in which the respective three portions of the side (side edge) parallel to the cell extending direction of the electrode body are inwardly dented. Here, FIG. 5E to FIG. 5G are plan views schematically showing the still other examples of the first electrode body.

Moreover, there is not any special restriction also on the outer peripheral shape of another electrode body to be disposed in an upper layer above the first electrode body. However, an area of this other electrode body is smaller than an area of the first electrode body, and when the other electrode body is disposed on the first electrode body, a center angle of the other electrode body is smaller than a center angle of the first electrode body in at least one cross section perpendicular to the cell extending direction.

Figure 6A:
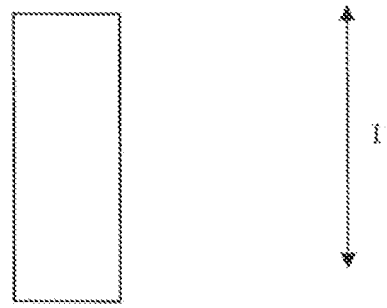
FIG. 6A is a plan view schematically showing one example of a second electrode body.
Figure 6B:
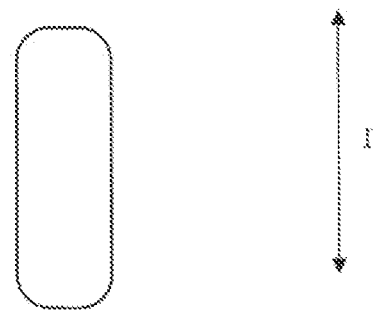
FIG. 6B is a plan view schematically showing another example of the second electrode body.

Here, an outer peripheral shape and the like of the other electrode body (in other words, the second electrode body) will be described by taking a second electrode body as an example of the other electrode body. Examples of the outer peripheral shape of the second electrode body 31b include such "a rectangular shape" as shown in FIG. 6A, and such "a shape obtained by curvedly forming the corner portions of the rectangular shape" as shown in FIG. 6B. Moreover, the outer peripheral shape of the second electrode body 31b may be "the shape formed by linearly chamfering the corner portions of the rectangular shape". The outer peripheral shape of the second electrode body 31b may be the composite application of "the curved form" and "the linear form". FIG. 6A is a plan view schematically showing one example of the second electrode body. FIG. 6B is a plan view schematically showing another example of the second electrode body. Moreover, character I in FIG. 5A and FIG. 5B indicates the cell extending direction.

Figure 6C:
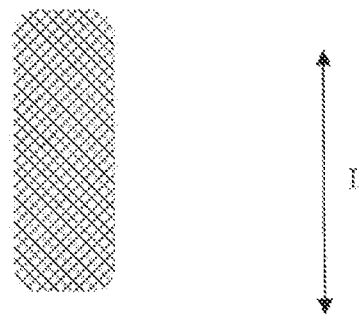
FIG. 6C is a plan view schematically showing still another example of the second electrode body.
Figure 6D:
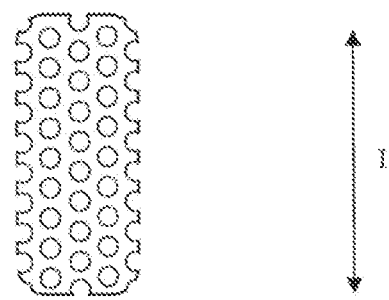
FIG. 6D is a plan view schematically showing a further example of the second electrode body.

Moreover, the second electrode body 31b may be, for example, such a "net-like (mesh-like)" electrode body as shown in FIG. 6C. Furthermore, the second electrode body may be such an electrode body of "the shape obtained by forming the dot-like voids (pores) in the electrode body" as shown in FIG. 6D. When the first electrode body 31a and the second electrode body 31b are both the electrode bodies of the "net-like (mesh-like)" shape or "the shape in which the dot-like voids (pores) are formed", there is not any special restriction on mesh or dot patterns of the first electrode body 31a and the second electrode body 31b. That is, in the first electrode body 31a and the second electrode body 31b, the mesh or dot patterns may be the same or different. For example, when the mesh or dot patterns of the first electrode body 31a are different from those of the second electrode body 31b, the second electrode body 31b may be disposed so as to leave void portions of the first electrode body 31a. "The void portions of the first electrode body 31a" are voids formed by the meshes or dots. Moreover, the void portions of the second electrode body 31b may be narrow (e.g., the meshes are fine), and the void portions of the first electrode body 31a may be decreased by the second electrode body 31b. It is to be noted that the electrode bodies of the second layer or more (e.g., the second electrode body 31b) having less void portions (in other words, a lower open area ratio) have more excellent energization performance as compared with the first electrode body 31a.

Figure 6E:
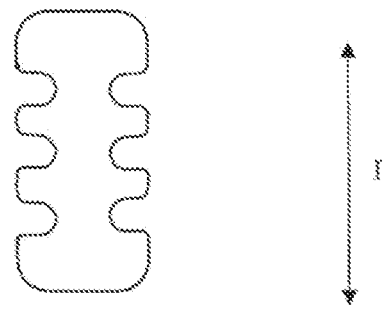
FIG. 6E is a plan view schematically showing a still further example of the second electrode body.

Furthermore, the second electrode body 31b may have, for example, the shape in which a part of the side parallel to the cell extending direction I in the sides constituting the outer peripheral shape of the second electrode body is inwardly dented. For example, the second electrode body 31b shown in FIG. 6E shows an example of the case where in the electrode body whose outer peripheral shape is "the shape obtained by curvedly forming the corner portions of the rectangular shape", the respective three portions of the side (side edge) parallel to the cell extending direction of the corresponding electrode body are cut in the circular form. Here, FIG. 6C to FIG. 6E are plan views schematically showing the other examples of the second electrode body.

Here, the first electrode bodies 31a of the respective outer peripheral shapes shown in FIG. 5A to FIG. 5G are "first electrode bodies A to G", respectively, and the second electrode bodies 31b of the respective outer peripheral shapes shown in FIG. 6A to FIG. 6E are "second electrode bodies A to E", respectively. For example, the first electrode body 31a shown in FIG. 5A is "the first electrode body A", and for example, the second electrode body 31b shown in FIG. 6A is "the second electrode body A". In such a case, there is not any special restriction on a combination of the respective electrode bodies (i.e., the first electrode body and the second electrode body). Examples of a preferable combination of the electrode bodies include combinations as follows.

The first electrode body A can suitably be combined with all the second electrode bodies A to E. The first electrode body B is preferably combined with one of the second electrode bodies B and E. The first electrode body C is preferably combined with one of the second electrode bodies B and E. The first electrode body D is preferably combined with one of the second electrode bodies B and E. The first electrode body E is preferably combined with one of the second electrode bodies B and C. The first electrode body F is preferably combined with one of the second electrode bodies B and D. The first electrode body G is preferably combined with one of the second electrode bodies B and E.

Figure 7A:
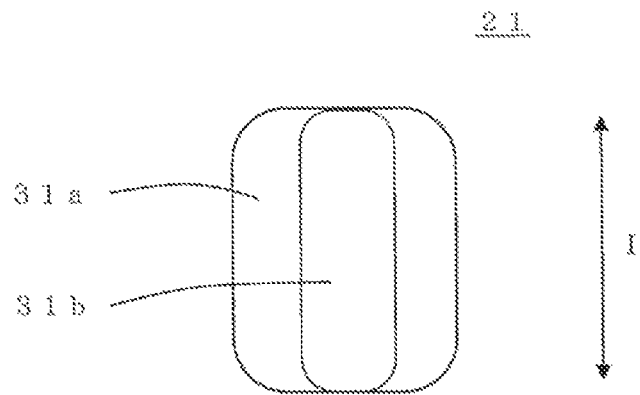
FIG. 7A is a plan view schematically showing one example of an electrode section.
Figure 7B:
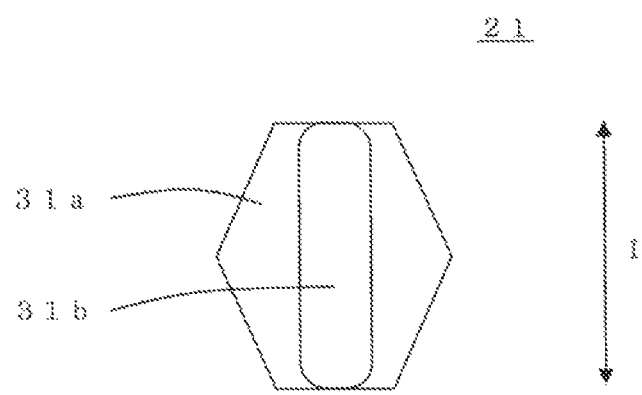
FIG. 7B is a plan view schematically showing another example of the electrode section.
Figure 7C:
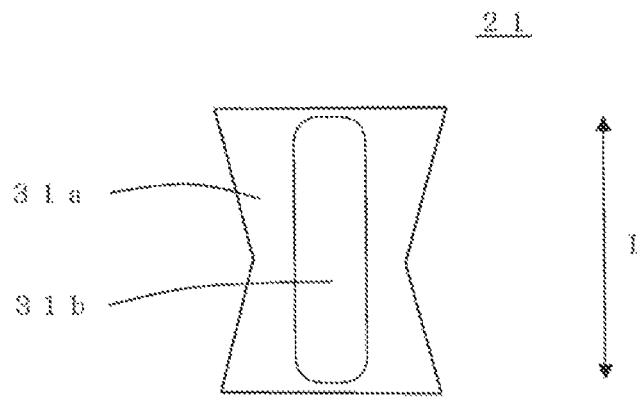
FIG. 7C is a plan view schematically showing still another example of the electrode section.
Figure 7D:
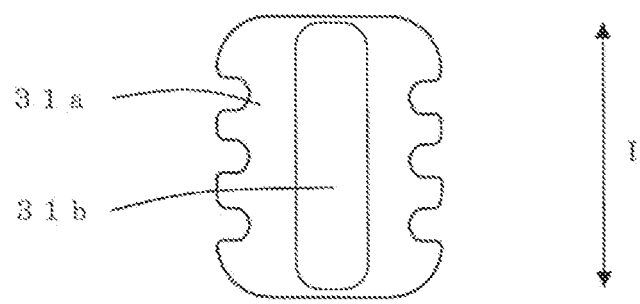
FIG. 7D is a plan view schematically showing a further example of the electrode section.
Figure 7E:
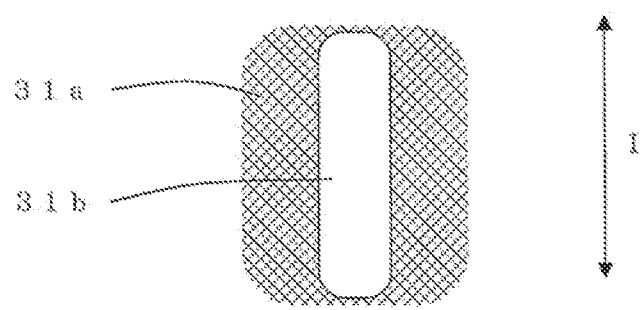
FIG. 7E is a plan view schematically showing a further example of the electrode section.
Figure 7F:
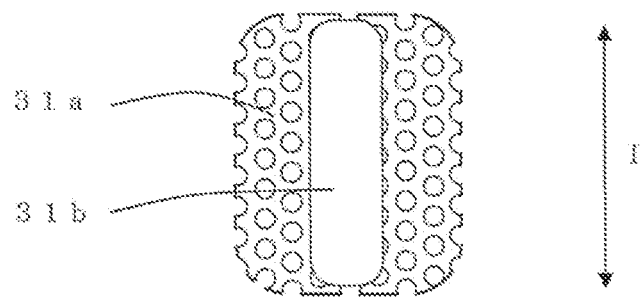
FIG. 7F is a plan view schematically showing a further example of the electrode section.
Figure 7G:
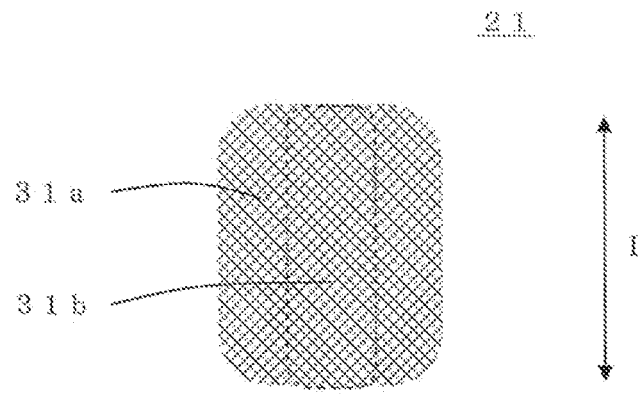
FIG. 7G is a plan view schematically showing a further example of the electrode section.
Figure 7H:
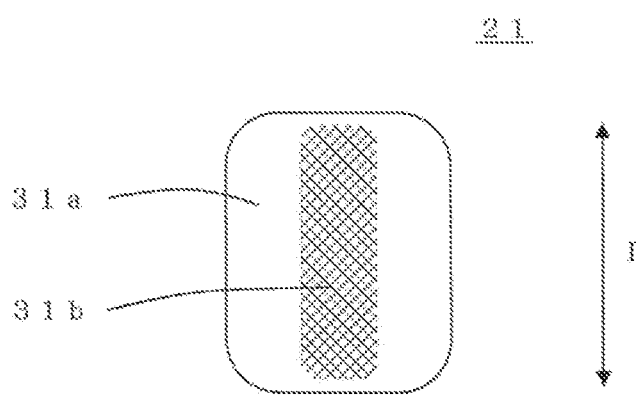
FIG. 7H is a plan view schematically showing a further example of the electrode section.
Figure 7I:
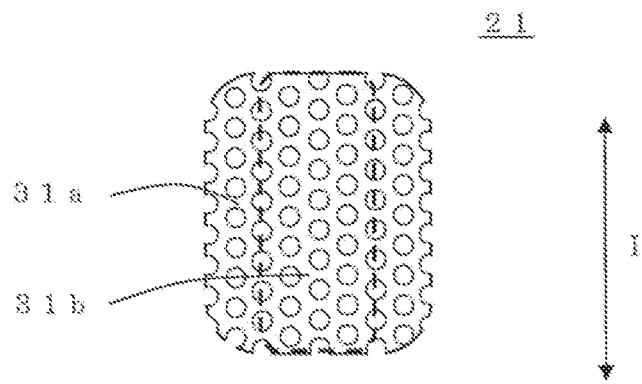
FIG. 7I is a plan view schematically showing a further example of the electrode section.
Figure 7J:
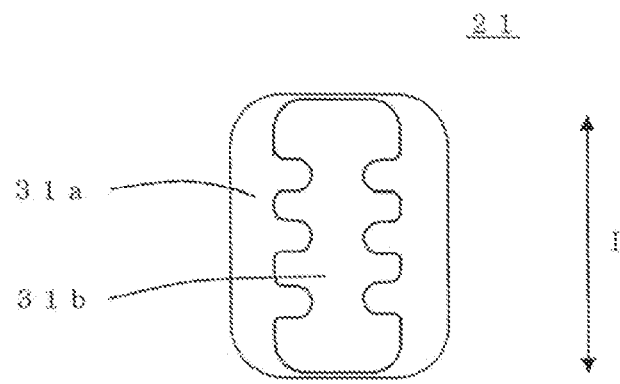
FIG. 7J is a plan view schematically showing a still further example of the electrode section.

Here, FIG. 7A shows the electrode section 21 in which the first electrode body B (the first electrode body 31a) is combined with the second electrode body B (the second electrode body 31b). FIG. 7B shows the electrode section 21 in which the first electrode body C (the first electrode body 31a) is combined with the second electrode body B (the second electrode body 31b). FIG. 7C shows the electrode section 21 in which the first electrode body D (the first electrode body 31a) is combined with the second electrode body B (the second electrode body 31b). FIG. 7D shows the electrode section 21 in which the first electrode body G (the first electrode body 31a) is combined with the second electrode body B (the second electrode body 31b). FIG. 7E shows the electrode section 21 in which the first electrode body E (the first electrode body 31a) is combined with the second electrode body B (the second electrode body 31b). FIG. 7F shows the electrode section 21 in which the first electrode body F (the first electrode body 31a) is combined with the second electrode body B (the second electrode body 31b). FIG. 7G shows the electrode section 21 in which the first electrode body E (the first electrode body 31a) is combined with the second electrode body C (the second electrode body 31b). FIG. 7H shows the electrode section 21 in which the first electrode body B (the first electrode body 31a) is combined with the second electrode body C (the second electrode body 31b). FIG. 7I shows the electrode section 21 in which the first electrode body F (the first electrode body 31a) is combined with the second electrode body D (the second electrode body 31b). FIG. 7J shows the electrode section 21 in which the first electrode body B (the first electrode body 31a) is combined with the second electrode body E (the second electrode body 31b). In FIG. 7G and FIG. 7I, a boundary portion between the first electrode body 31a and the second electrode body 31b is shown by a broken line.

When the second electrode body is laminated on the first electrode body, the outer peripheral shape of the second electrode body may be a shape which is symmetric to "a center line passing the gravity center of the planar shape of the first electrode body and dividing the area of the first electrode body into two equal areas in the cell extending direction". Moreover, the above-mentioned outer peripheral shape of the second electrode body may be a shape which is asymmetric to "the center line passing the gravity center of the planar shape of the first electrode body and dividing the area of the first electrode body into the two equal areas in the cell extending direction". It is to be noted that the symmetric shape is preferable. With such a shape, the current is scattered evenly to the right and the left.

Moreover, in the honeycomb structure of the present embodiment, an electrical resistivity of the other electrode body in the two or more electrode bodies constituting each of the pair of electrode sections is preferably a value corresponding to 5 to 100% of an electrical resistivity of the first electrode body of each electrode section. Furthermore, the electrical resistivity of the other electrode body is further preferably a value corresponding to 10 to 90%, and especially preferably a value corresponding to 50 to 90% of the electrical resistivity of the first electrode body of each electrode section. According to such a constitution, heat generation concentration which occurs right under the electrode section or at both ends of the electrode section can suitably be scattered to a plurality of portions, and a local temperature rise of the honeycomb structure can suitably be suppressed. That is, the maximum temperature of the honeycomb structure at the heat generation can be lowered. Moreover, the purification performance (the emission performance) of the exhaust gas of the honeycomb structure 100 can be enhanced. For example, when the electrical resistivity of the other electrode body is smaller than 5%, or in excess of 100% of the electrical resistivity of the first electrode body, the flow of the current from each electrode section to the honeycomb structure section is not easily scattered.

In the honeycomb structure of the present embodiment, the electrical resistivity of the first electrode body is preferably from 0.01 to 100 $\Omega$cm. Furthermore, the electrical resistivity of the first electrode body is further preferably from 0.1 to 10 $\Omega$cm, and especially preferably from 0.6 to 5 $\Omega$cm. With the result that the electrical resistivity of the first electrode body is in such a range, the pair of electrode sections 21 and 21 effectively perform an electrode function in a piping line through which a high temperature exhaust gas flows. When the electrical resistivity of the first electrode body is smaller than 0.01 $\Omega$cm, the temperature of the honeycomb structure section in the vicinities of both the side edges of the first electrode body easily rises sometimes in the cross section perpendicular to the cell extending direction. When the electrical resistivity of the first electrode body is larger than 100 $\Omega$cm, the current does not easily flow, and hence the function of the electrode is not easily performed sometimes. The electrical resistivity of the first electrode body is a value at 400° C.

Figure 13:
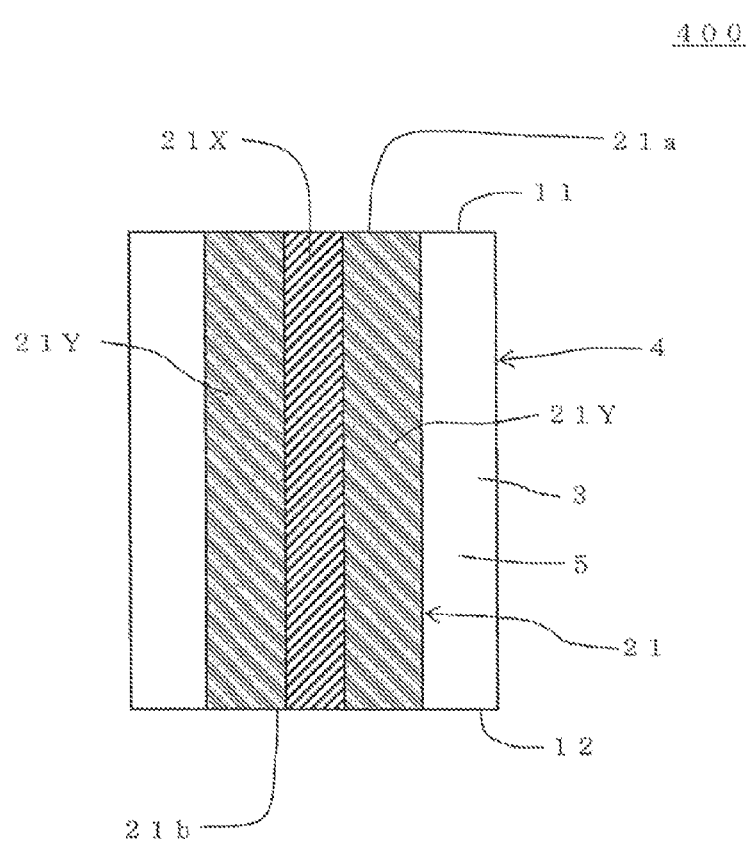
FIG. 13 is a front view schematically showing a further embodiment of the honeycomb structure of the present invention.
Figure 14:
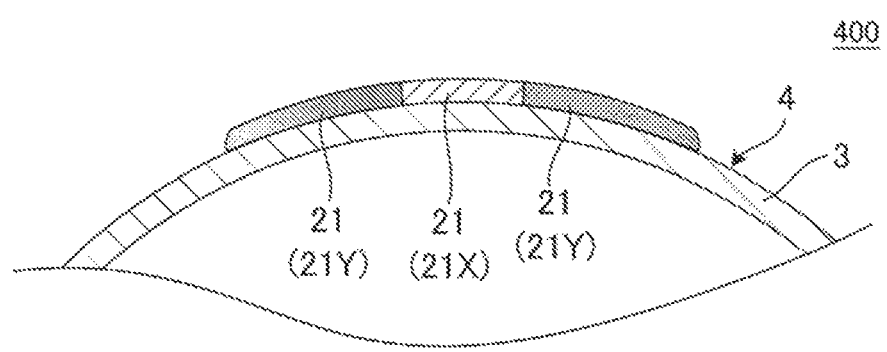
FIG. 14 is a schematic view showing a cross section perpendicular to a cell extending direction in the further embodiment of the honeycomb structure of the present invention.

When an electrical resistivity of the electrode section 21 partially varies, an electrode section 21 is preferably constituted of a central portion 21X and extended portions 21Y and 21Y as in a honeycomb structure 400 shown in FIG. 13 and FIG. 14. Moreover, an electrical resistivity of the central portion 21X of the electrode section 21 is preferably smaller than an electrical resistivity of each of the extended portions 21Y and 21Y of the electrode section 21. The central portion 21X is a central portion of the electrode section 21 in a peripheral direction in a cross section perpendicular to an extending direction of cells 2. The extended portions 21Y and 21Y are portions positioned on both sides of the central portion 21X in the peripheral direction in the cross section perpendicular to the extending direction of the cells 2. In this way, when the electrical resistivity of the central portion 21X of the electrode section 21 is smaller than the electrical resistivity of the extended portion 21Y of the electrode section 21, a current easily flows to the central portion 21X having a low electrical resistivity at application of a voltage to the central portion 21X of the electrode section 21. Therefore, unevenness of the flow of the current in the cell extending direction of the honeycomb structure decreases. In consequence, unevenness of a temperature distribution in the extending direction of the cells 2 of a honeycomb structure section 4 can effectively be suppressed. FIG. 13 is a front view schematically showing a further embodiment of the honeycomb structure of the present invention. FIG. 14 is a schematic view showing a cross section perpendicular to the cell extending direction in the further embodiment of the honeycomb structure of the present invention. It is to be noted that in FIG. 13 and FIG. 14, the electrode section is shown from which a laminated structure of a first electrode body and a second electrode body is eliminated.

The electrical resistivity of the central portion 21X is preferably from 0.0001 to 70%, further preferably from 0.001 to 50%, and especially preferably from 0.001 to 10% of the electrical resistivity of the extended portions 21Y and 21Y. When the percentage is smaller than 0.0001%, the flow of the current in an outer peripheral direction in a cross section perpendicular to a central axis of the honeycomb structure section decreases, and the unevenness of the temperature distribution increases sometimes. When the percentage is larger than 70%, an effect of suppressing the unevenness of the temperature distribution of the honeycomb structure 400 deteriorates sometimes.

Moreover, in the honeycomb structure 100 of the present embodiment, a Young's modulus of the electrode section 21 is preferably from 2 to 50 GPa, further preferably from 3 to 45 GPa, and especially preferably from 3 to 35 GPa. With the result that the Young's modulus of the electrode section 21 is in such a range, an isostatic strength of the electrode section 21 can be acquired, and cracks are not easily generated in the honeycomb structure section. When the Young's modulus of the electrode section 21 is smaller than 2 GPa, the isostatic strength of the electrode section 21 cannot be acquired sometimes. When the Young's modulus of the electrode section 21 is larger than 50 GPa, a rigidity increases, and hence the cracks are easily generated in the honeycomb structure section.

The Young's modulus of each electrode section is a value measured by a bending resonance method in conformity to JIS R1602. As a test piece for use in the measurement, there is used a test piece obtained by laminating a plurality of sheets made of an electrode section forming raw material that forms the electrode section, to obtain a laminated body, drying this laminated body, and then cutting the body into a size of 3 mm×4 mm×40 mm.

In the honeycomb structure of the present invention, a total of heat capacities of the pair of electrode sections is preferably from 2 to 150% of a heat capacity of the whole outer peripheral wall. In such a range, an amount of heat to be accumulated in the electrode section decreases, and the heat shock resistance of the honeycomb structure further enhances. Therefore, when the honeycomb structure is mounted in an exhaust system of an internal combustion engine and used, generation of large stress in the honeycomb structure section can be suppressed, even if a rapid temperature change is present. The total of the heat capacities of the pair of electrode sections is further preferably not more than the heat capacity of the whole outer peripheral wall (i.e., from 2 to 100%), and is especially preferably smaller than the heat capacity of the outer peripheral wall. In consequence, the amount of the heat to be accumulated in the electrode section further decreases, and the heat shock resistance of the honeycomb structure further enhances. Therefore, when the honeycomb structure is mounted in the exhaust system of the internal combustion engine and used, the generation of the large stress in the honeycomb structure section can further be suppressed, even if the rapid temperature change is present. The total of the heat capacities of the pair of electrode sections is a value obtained by a method of heat capacity calculation in which a porosity, a specific gravity of a material and specific heat are taken into consideration based on a volume of the electrode section. The above "volume of the electrode section" is the volume of the electrode section which is calculated by using an average thickness of the electrode section and an electrode angle (the center angle α in FIG. 3) which are measured by an optical microscope. The heat capacity of the whole outer peripheral wall is a value obtained by a method of the heat capacity calculation in which the porosity, the specific gravity of the material and the specific heat are taken into consideration based on a volume of the outer peripheral wall. The above "volume of the outer peripheral wall" is the volume of the outer peripheral wall which is calculated by using an average thickness of the outer peripheral wall measured by the optical microscope. In the present description, an area of a portion where the electrode section is disposed in the side surface of the honeycomb structure section is "the area where the electrode section is disposed". Moreover, a cylinder which is coaxial with the honeycomb structure section and divides the electrode section is assumed, and a dividing surface of the electrode section divided by the cylinder is a virtual dividing surface. Furthermore, an area of this virtual dividing surface is "the virtual dividing area". During the calculation of "the heat capacity of the electrode section" in the present description, a portion where the above "virtual dividing area" is 90% or more of the above "area where the electrode section is disposed" is "the electrode section". That is, during the calculation of "the heat capacity of the electrode section" in the present description, a portion where the above "virtual dividing area" is smaller than 90% of the above "area where the electrode section is disposed" is not "the electrode section".

In the honeycomb structure of the present embodiment, when "the total of the heat capacities of the pair of electrode sections is smaller than the heat capacity of the whole outer peripheral wall", specifically, the total of the heat capacities of the pair of electrode sections is preferably from 2 to 80% of the heat capacity of the whole outer peripheral wall. A lower limit value is further preferably 9%, and especially preferably 15%. Moreover, an upper limit value is further preferably 75%, and especially preferably 50%. When the percentage is smaller than 2%, there is the fear that at the application of the voltage, an effect of allowing the current to more evenly flow through the whole honeycomb structure section cannot sufficiently be obtained. When the percentage is larger than 80%, an effect of lowering the heat shock resistance decreases sometimes.

Moreover, in the honeycomb structure of the present embodiment, a thickness of the other electrode body in the two or more electrode bodies of each electrode section is preferably a thickness corresponding to 50 to 150% of a thickness of the first electrode body of each electrode section. Furthermore, the thickness of the other electrode body is further preferably a thickness corresponding to 50 to 100%, and especially preferably a thickness corresponding to 70 to 100%.

The thickness of the electrode body is a value measured by the optical microscope, and a value of an average thickness of three points of the electrode body in the peripheral direction in "the central portion of the honeycomb structure in the cell extending direction". "The value of the average thickness of the three points of the electrode body in the peripheral direction" is a value obtained by dividing the electrode body into three equal portions "in the peripheral direction of the honeycomb structure section" to form three divided portions, measuring a thickness of the central portion of each divided portion "in the peripheral direction of the honeycomb structure section", and averaging the obtained measurement results of the thicknesses of the three points. The dividing of the electrode body into the three equal portions in the peripheral direction of the honeycomb structure section means that the electrode body is divided into three equal portions by a straight line parallel to the cell extending direction.

In the honeycomb structure of the present embodiment, the thickness of the first electrode body is preferably from 0.1 to 2.0 mm, further preferably from 0.1 to 1.0 mm, and especially preferably from 0.1 to 0.5 mm. By decreasing the thickness of the first electrode body, the heat capacity of the electrode section can be lowered, and the heat shock resistance of the honeycomb structure can be enhanced. On the other hand, in the honeycomb structure of the present embodiment, the electrode body is further laminated on the surface of the first electrode body, and hence the energization performance of the electrode section can be enhanced.

In the honeycomb structure of the present embodiment, the porosity of the pair of electrode sections is preferably from 30 to 80%, further preferably from 30 to 70%, and especially preferably from 30 to 60%. With the result that the porosity of the electrode section is in such a range, the heat capacity of the electrode section can be lowered, and the heat shock resistance of the honeycomb structure can be enhanced. When the porosity of the electrode section is smaller than 30%, the heat capacity of the electrode section is not easily decreased sometimes. When the porosity of the electrode section is larger than 80%, it is difficult to allow the current to evenly flow through the honeycomb structure section sometimes. The porosity of the electrode section is a value measured by a mercury porosimeter.

The respective electrode bodies 31a and 31b constituting the electrode section 21 preferably contain silicon carbide particles and silicon as main components, and are further preferably formed by using the silicon carbide particles and silicon as raw materials, except usually contained impurities. Here, when "the silicon carbide particles and silicon are the main components", it is meant that a total mass of the silicon carbide particles and silicon is 90 mass % or more of a total mass of the respective electrode bodies 31a and 31b. In particular, when the first electrode body 31a contains the silicon carbide particles and silicon as the main components, the components of the first electrode body 31a and the components of the honeycomb structure section 4 are the same components or close components (when a material of the honeycomb structure section is silicon carbide). Therefore, a thermal expansion coefficient of the first electrode body 31a is the same value as or a value close to that of the honeycomb structure section 4. Moreover, the material of the first electrode body 31a is the same as or close to the material of the honeycomb structure section 4, and hence a joining strength between the first electrode body 31a and the honeycomb structure section 4 also increases. Therefore, even when heat stress is applied to the honeycomb structure, the first electrode body 31a (in other words, the electrode section 21) can be prevented from peeling from the honeycomb structure section 4, and a joining portion between the first electrode body 31a (in other words, the electrode section 21) and the honeycomb structure section 4 can be prevented from being damaged.

In the respective electrode bodies 31a and 31b constituting the electrode section 21, an average pore diameter is preferably from 5 to 45 µm, and further preferably from 7 to 40 µm. With the result that the average pore diameter of the respective electrode bodies 31a and 31b constituting the electrode section 21 is in such a range, a suitable electrical resistivity can be obtained. When the average pore diameter of the respective electrode bodies 31a and 31b constituting the electrode section 21 is smaller than 5 µm, the electrical resistivity excessively increases sometimes. When the average pore diameter of the respective electrode bodies 31a and 31b constituting the electrode section 21 is larger than 45 µm, a strength of the electrode section 21 decreases, and the electrode section is easily damaged sometimes. The average pore diameter is a value measured by the mercury porosimeter.

When the main components of the respective electrode bodies 31a and 31b constituting the electrode section 21 are the silicon carbide particles and silicon, an average particle diameter of the silicon carbide particles contained in the respective electrode bodies 31a and 31b is preferably from 10 to 70 µm, and further preferably from 10 to 60 µm. With the result that the average particle diameter of the silicon carbide particles contained in the respective electrode bodies 31a and 31b is in such a range, the electrical resistivity of the respective electrode bodies 31a and 31b can be controlled into a suitable value. When the average particle diameter of the silicon carbide particles contained in the respective electrode bodies 31a and 31b is smaller than 10 µm, the electrical resistivity of the electrode section 21 excessively increases sometimes. When the average particle diameter of the silicon carbide particles contained in the respective electrode bodies 31a and 31b is larger than 70 µm, the strength of the electrode section 21 decreases, and the electrode section is easily damaged sometimes. The average particle diameter of the silicon carbide particles contained in the respective electrode bodies 31a and 31b is a value measured by a laser diffraction method.

A ratio of a mass of silicon contained in the respective electrode bodies 31a and 31b to "the total of the respective masses of the silicon carbide particles and silicon" contained in the respective electrode bodies 31a and 31b is preferably from 20 to 50 mass %, and further preferably from 20 to 40 mass %. With the result that the ratio of the mass of silicon to the total of the respective masses of the silicon carbide particles and silicon contained in the respective electrode bodies 31a and 31b is in such a range, the electrical resistivity of the respective electrode bodies 31a and 31b can be controlled in a range of 0.01 to 100 Ωcm. When the ratio of the mass of silicon to the total of the respective masses of the silicon carbide particles and silicon contained in the respective electrode bodies 31a and 31b is smaller than 20 mass %, the electrical resistivity excessively increases sometimes, and when the ratio is larger than 50 mass %, each electrode body is easily deformed sometimes during manufacturing.

In the honeycomb structure 100 of the present embodiment, a partition wall thickness is from 50 to 260 µm, and preferably from 70 to 180 µm. With the result that the partition wall thickness is in such a range, a pressure loss at the flowing of the exhaust gas can be prevented from being excessively increased, even when the honeycomb structure 100 is used as a catalyst carrier and a catalyst is loaded thereonto. When the partition wall thickness is smaller than 50 µm, a strength of the honeycomb structure deteriorates sometimes. When the partition wall thickness is larger than 260 µm, the pressure loss at the flowing of the exhaust gas increases sometimes in the case where the honeycomb structure 100 is used as the catalyst carrier and the catalyst is loaded thereonto.

In the honeycomb structure 100 of the present embodiment, a cell density is preferably from 40 to 150 cells/cm$^2$, and further preferably from 70 to 100 cells/cm$^2$. With the result that the cell density is in such a range, the purification performance of the catalyst can be enhanced in a state where the pressure loss at the flowing of the exhaust gas is decreased. When the cell density is lower than 40 cells/cm$^2$, a catalyst loading area decreases sometimes. When the cell density is higher than 150 cells/cm$^2$, the pressure loss at the flowing of the exhaust gas increases sometimes, in the case where the honeycomb structure 100 is used as the catalyst carrier and the catalyst is loaded thereonto.

In the honeycomb structure 100 of the present embodiment, an average particle diameter of the silicon carbide particles (aggregates) constituting the honeycomb structure section 4 is preferably from 3 to 50 µm, and further preferably from 3 to 40 µm. With the result that the average particle diameter of the silicon carbide particles constituting the honeycomb structure section 4 is in such a range, the electrical resistivity of the honeycomb structure section 4 at 400° C. can be from 1 to 200 Ωcm. When the average particle diameter of the silicon carbide particles is smaller than 3 µm, the electrical resistivity of the honeycomb structure section 4 increases sometimes. When the average particle diameter of the silicon carbide particles is larger than 50 μm, the electrical resistivity of the honeycomb structure section 4 decreases sometimes. Furthermore, when the average particle diameter of the silicon carbide particles is larger than 50 μm, a die for extrusion forming is clogged with a forming raw material sometimes during the extrusion forming of a formed honeycomb body. The average particle diameter of the silicon carbide particles is a value measured by the laser diffraction method.

In the honeycomb structure 100 of the present embodiment, the electrical resistivity of the honeycomb structure section 4 is from 1 to 200 Ωcm, and preferably from 40 to 100 Ωcm. When the electrical resistivity is smaller than 1 Ωcm, the current excessively flows sometimes, for example, at energization of the honeycomb structure 100 by a power source of a high voltage of 200 V or more. When the electrical resistivity is larger than 200 Ωcm, the current does not easily flow, and heat is not sufficiently generated sometimes, for example, at the energization of the honeycomb structure 100 by the power source of the high voltage of 200 V or more. The electrical resistivity of the honeycomb structure section is a value measured by a four-terminals method. The electrical resistivity of the honeycomb structure section is a value at 400° C.

In the honeycomb structure 100 of the present embodiment, the electrical resistivity of the first electrode body 31a is preferably lower than the electrical resistivity of the honeycomb structure section 4. Furthermore, the electrical resistivity of the first electrode body 31a is further preferably 20% or less, and especially preferably from 1 to 10% of the electrical resistivity of the honeycomb structure section 4. With the result that the electrical resistivity of the first electrode body 31a is 20% or less of the electrical resistivity of the honeycomb structure section 4, the electrode section 21 more effectively functions as the electrode.

In the honeycomb structure 100 of the present embodiment, when the material of the honeycomb structure section 4 is a silicon-silicon carbide composite material, the following "mass ratio of silicon" is preferably from 10 to 40 mass %, and further preferably from 15 to 35 mass %. When "the mass ratio of silicon" is lower than 10 mass %, the strength of the honeycomb structure deteriorates sometimes. When the ratio is higher than 40 mass %, the shape cannot be held at firing. "The mass ratio of silicon" is a ratio of "a mass of silicon as a binding agent" contained in the honeycomb structure section 4 to a total of "a mass of the silicon carbide particles as the aggregates" contained in the honeycomb structure section 4 and "the mass of silicon as the binding agent" contained in the honeycomb structure section 4.

A porosity of the partition walls 1 of the honeycomb structure section 4 is preferably from 35 to 60%, and further preferably from 45 to 55%. When the porosity is smaller than 35%, deformation at the firing increases sometimes. When the porosity is in excess of 60%, the strength of the honeycomb structure deteriorates sometimes. The porosity is a value measured by the mercury porosimeter.

An average pore diameter of the partition walls 1 of the honeycomb structure section 4 is preferably from 2 to 15 μm, and further preferably from 4 to 8 μm. When the average pore diameter is smaller than 2 μm, the electrical resistivity excessively increases sometimes. When the average pore diameter is larger than 15 μm, the electrical resistivity excessively decreases sometimes. The average pore diameter is a value measured by the mercury porosimeter.

Moreover, in the honeycomb structure of the present embodiment, a porosity of the outer peripheral wall of the honeycomb structure section is preferably from 35 to 60%, further preferably from 35 to 55%, and especially preferably from 35 to 50%. With the result that the porosity of the outer peripheral wall of the honeycomb structure section is in such a range, the heat shock resistance of the honeycomb structure can be enhanced. When the porosity of the outer peripheral wall of the honeycomb structure section is smaller than 35%, an effect of enhancing the heat shock resistance of the honeycomb structure deteriorates sometimes. When the porosity of the outer peripheral wall of the honeycomb structure section is larger than 60%, a mechanical strength of the honeycomb structure deteriorates sometimes.

There is not any special restriction on a thickness of the outer peripheral wall of the honeycomb structure section. The thickness of the outer peripheral wall is preferably from 0.1 to 1.0 mm, further preferably from 0.2 to 0.8 mm, and especially preferably from 0.2 to 0.5 mm. With the result that the thickness of the outer peripheral wall of the honeycomb structure section is in such a range, the heat shock resistance of the honeycomb structure can be enhanced. Moreover, in consequence, the pressure loss at the flowing of the exhaust gas can be prevented from being excessively increased, even when the honeycomb structure is used as the catalyst carrier and the catalyst is loaded thereonto. When the thickness of the outer peripheral wall of the honeycomb structure section is smaller than 0.1 mm, the strength of the honeycomb structure deteriorates sometimes. When the thickness of the outer peripheral wall of the honeycomb structure section is larger than 1.0 mm, the heat shock resistance of the honeycomb structure deteriorates sometimes. Moreover, when the thickness of the outer peripheral wall of the honeycomb structure section is larger than 1.0 mm, an area of the partition walls onto which the catalyst is loaded decreases sometimes, in the case where the honeycomb structure is used as the catalyst carrier and the catalyst is loaded thereonto.

In the honeycomb structure 100 of the present embodiment, a shape of the cells 2 in the cross section perpendicular to the extending direction of the cells 2 is preferably a quadrangular shape, a hexagonal shape, an octagonal shape, or any combination of these shapes. With such a cell shape, the pressure loss at the flowing of the exhaust gas through the honeycomb structure 100 decreases, and the purification performance of the catalyst is excellent.

There is not any special restriction on a shape of the honeycomb structure 100 of the present embodiment, and examples of the shape include a tubular shape (a cylindrical shape) with a bottom surface having a round shape, a tubular shape with a bottom surface having an oval shape, and a tubular shape with a bottom surface having a polygonal shape (a quadrangular shape, a pentangular shape, a hexagonal shape, a heptagonal shape, an octagonal shape, etc.). Moreover, as to a size of the honeycomb structure, an area of the bottom surface is preferably from 2000 to 20000 $mm^2$, and further preferably from 4000 to 10000 $mm^2$. Furthermore, a length of the honeycomb structure in a central axis direction (the cell extending direction) is preferably from 50 to 200 mm, and further preferably from 75 to 150 mm.

An isostatic strength of the honeycomb structure 100 of the present embodiment is preferably 1 MPa or more, and further preferably 3 MPa or more. A larger value of the isostatic strength is more preferable, but an upper limit is about 6 MPa, when a material, structure and the like of the honeycomb structure 100 are taken into consideration. When the isostatic strength is smaller than 1 MPa, the honeycomb structure is easily damaged sometimes during the use thereof as the catalyst carrier or the like. The isostatic strength is a value measured in water under a hydrostatic pressure.

As shown in FIG. 1 and FIG. 2, in the honeycomb structure 100 of the present embodiment, each of the pair of electrode sections 21 and 21 extends in the extending direction of the cells 2 of the honeycomb structure section 4, and is formed into a band-like shape "extending between both ends (between both the end surfaces 11 and 12)". In consequence, the pair of electrode sections 21 and 21 are disposed so as to extend between both the ends of the honeycomb structure section 4, whereby when the voltage is applied between the pair of electrode sections 21 and 21, the unevenness of the current flowing through the honeycomb structure section 4 can more effectively be suppressed. In consequence, the unevenness of the heat generation in the honeycomb structure section 4 can effectively be suppressed. Here, when "the electrode section 21 is formed (disposed) so as to extend between both the ends of the honeycomb structure section 4", a constitution in the following is meant. That is, it is meant that one end of the electrode section 21 comes in contact with one end (one end surface) of the honeycomb structure section 4, and the other end of the electrode section 21 comes in contact with the other end (the other end surface) of the honeycomb structure section 4.

Figure 8:
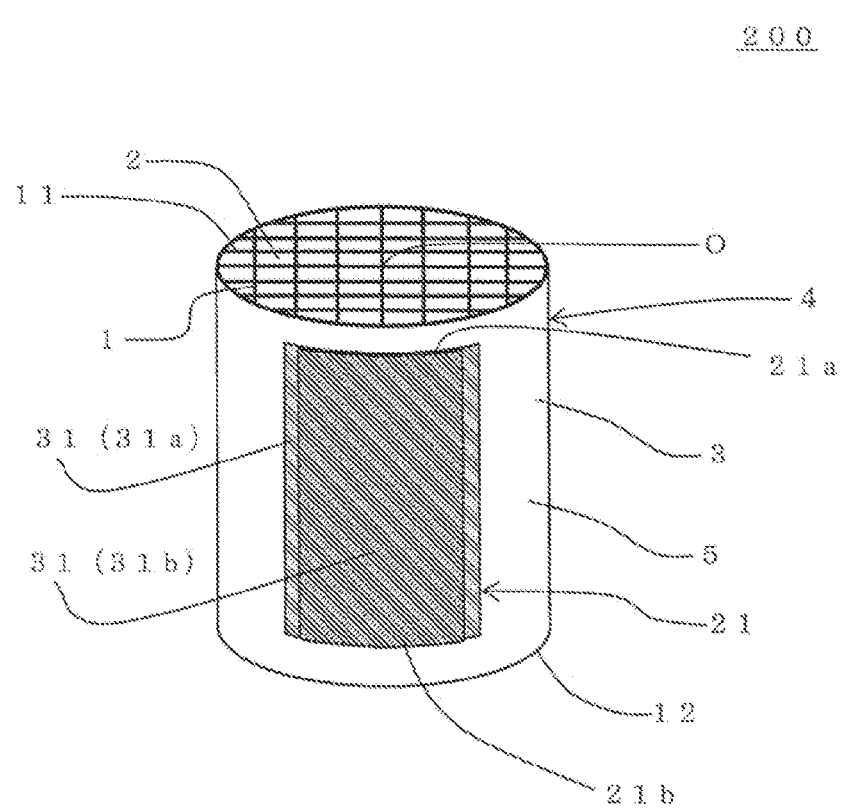
FIG. 8 is a perspective view schematically showing another embodiment of the honeycomb structure of the present invention.
Figure 9:
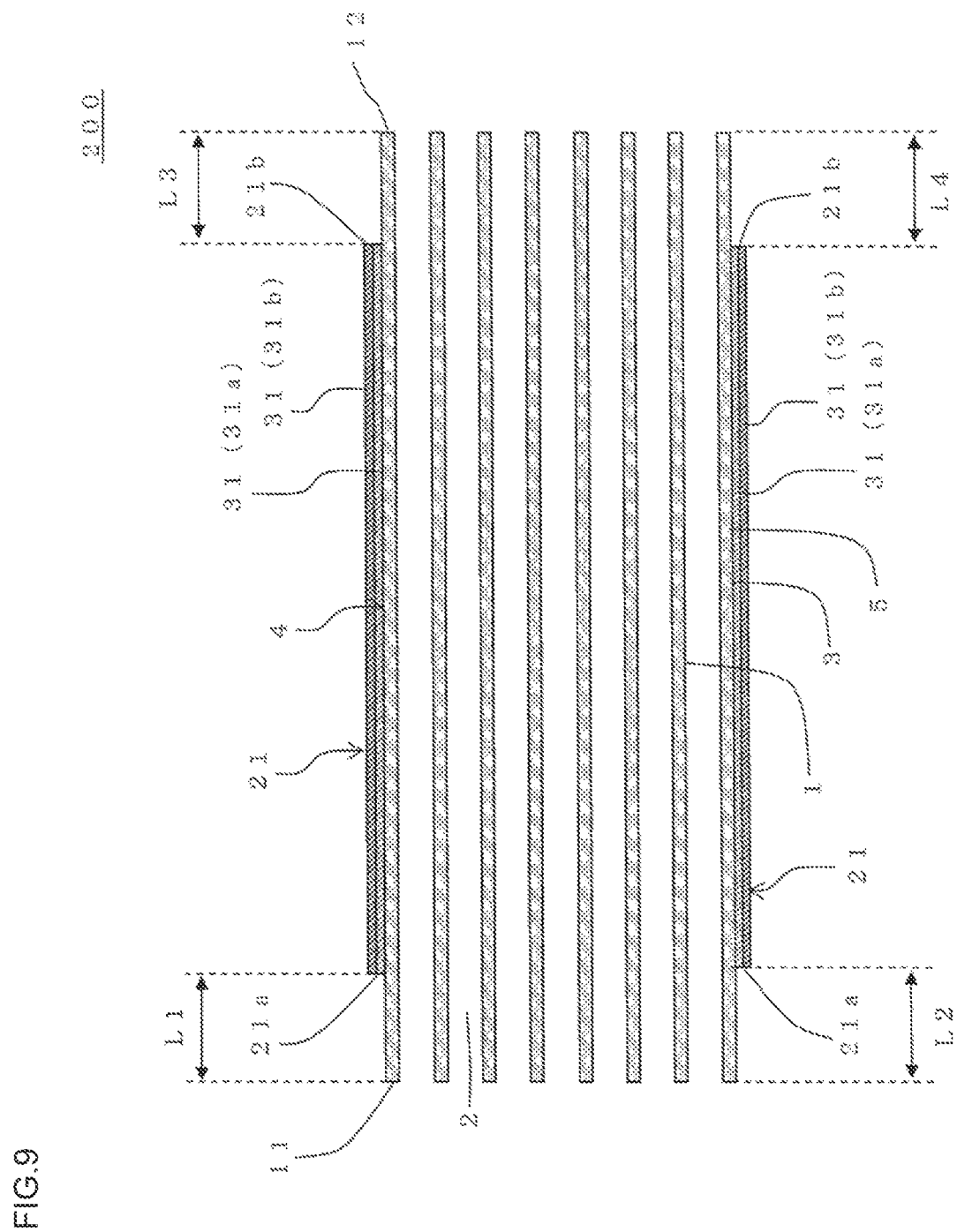
FIG. 9 is a schematic view showing a cross section parallel to a cell extending direction in the embodiment of the honeycomb structure of the present invention.

It is to be noted that the pair of electrode sections 21 and 21 may be formed so as to extend between both the ends of the honeycomb structure section 4 as shown in FIG. 1 and FIG. 2, but may have, for example, a constitution as follows. That is, as shown in FIG. 8 and FIG. 9, both ends 21a and 21b of the electrode section 21 in "an extending direction of cells 2 of a honeycomb structure section 4" do not have to come in contact with (do not have to reach) both ends (both end surfaces 11 and 12) of the honeycomb structure section 4. Moreover, the one end 21a of the electrode section 21 may come in contact with (reach) the one end (the one end surface 11) of the honeycomb structure section 4, and the other end 21b do not have to come in contact with (do not have to reach) the other end (the other end surface 12) of the honeycomb structure section 4.

Here, as shown in FIG. 9, a distance from the one end 21a in the one electrode section 21 in the pair of electrode sections 21 and 21 to "the one end (the one end surface 11) of the honeycomb structure section 4" is "a distance L1". Moreover, a distance from the one end 21a in the remaining one electrode section 21 in the pair of electrode sections 21 and 21 to "the one end (the one end surface 11) of the honeycomb structure section 4" is "a distance L2". "The distance L1" is preferably the same as "the distance L2", but may be different therefrom. Furthermore, as shown in FIG. 9, a distance from the other end 21b in the one electrode section 21 in the pair of electrode sections 21 and 21 to "the other end (the other end surface 12) of the honeycomb structure section 4" is "a distance L3". Additionally, a distance from the other end 21b in the remaining one electrode section 21 in the pair of electrode sections 21 and 21 to "the other end (the other end surface 12) of the honeycomb structure section 4" is "a distance L4". "The distance L3" is preferably the same as "the distance L4", but may be different therefrom. It is to be noted that the one end 21a of the electrode section 21 is an end that faces a side of the one end (the one end surface 11) of the honeycomb structure section 4, and the other end 21b of the electrode section 21 is an end that faces a side of the other end (the other end surface 12) of the honeycomb structure section 4. FIG. 8 is a perspective view schematically showing another embodiment (a honeycomb structure 200) of the honeycomb structure of the present invention. FIG. 9 is a schematic view showing a cross section parallel to a cell extending direction in the other embodiment (the honeycomb structure 200) of the honeycomb structure of the present invention. Respective conditions of the honeycomb structure 200 of the present embodiment are preferably the same as respective conditions in the honeycomb structure 100 shown in FIG. 1 to FIG. 3, except that at least one end of the electrode section 21 does not come in contact with (does not reach) the end (the end surface) of the honeycomb structure section 4.

Each of the above-mentioned "distance L1", "distance L2", "distance L3" and "distance L4" is preferably shorter than a distance of 50%, and further preferably 25% or less of a length of the honeycomb structure section 4 in the extending direction of the cells 2. When the percentage is 50% or more, unevenness of a current flowing through the honeycomb structure section 4 is not easily suppressed at application of a voltage between the pair of electrode sections 21 and 21.

Figure 10:
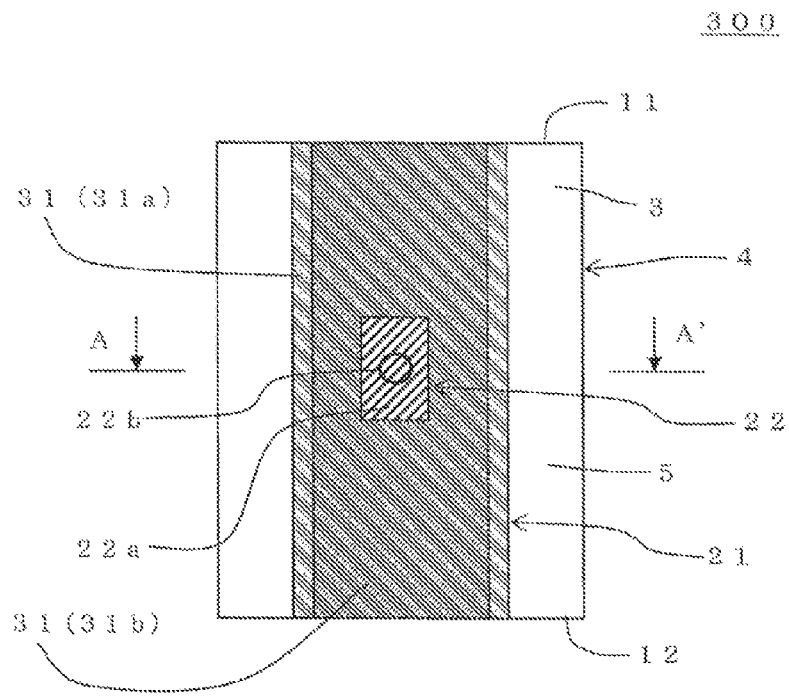
FIG. 10 is a front view schematically showing still another embodiment of the honeycomb structure of the present invention.
Figure 11:
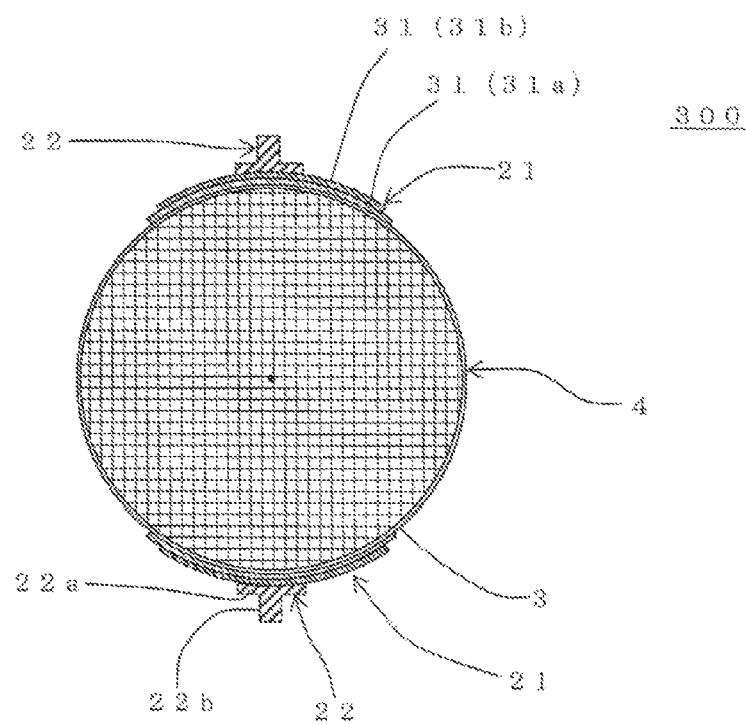
FIG. 11 is a schematic view showing a cross section cut along the A-A' line of FIG. 10.
Figure 12:
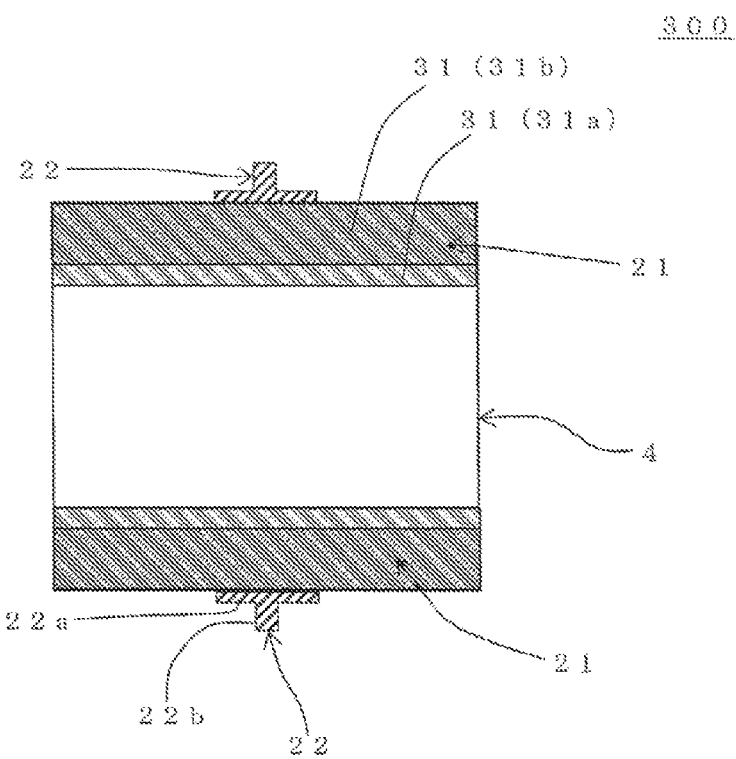
FIG. 12 is a side view schematically showing the still other embodiment of the honeycomb structure of the present invention.

Next, still another embodiment of the honeycomb structure of the present invention will be described. As shown in FIG. 10 to FIG. 12, in a honeycomb structure 300 of the present embodiment, electrode terminal projecting portions 22 having such a constitution as in the following are disposed in the honeycomb structure 100 (see FIG. 1 to FIG. 4) of the present invention described above. The electrode terminal projecting portion 22 is disposed in the center of each of electrode sections 21 and 21 in a cross section perpendicular to a cell extending direction, and is also disposed in the center in the cell extending direction. This electrode terminal projecting portion 22 is a portion to be connected to an electric wiring line. That is, the electrode terminal projecting portion 22 is a portion to be connected to the wiring line from a power source so that a voltage is applied between the electrode sections 21 and 21. The honeycomb structure 300 is provided with the electrode terminal projecting portions 22, so that when the voltage is applied between the electrode sections 21 and 21, unevenness of a temperature distribution of a honeycomb structure section 4 can further be decreased. FIG. 10 is a front view schematically showing still another embodiment of the honeycomb structure of the present invention. FIG. 11 is a schematic view showing a cross section cut along the A-A' line of FIG. 10. FIG. 12 is a side view schematically showing the still other embodiment of the honeycomb structure of the present invention.

Respective conditions of the honeycomb structure 300 of the present embodiment are preferably the same respective conditions as in the one embodiment (the honeycomb structure 100 (see FIG. 1 to FIG. 4)) of the honeycomb structure of the present invention, except that the electrode terminal projecting portions 22 having the above-mentioned constitution are disposed.

When main components of the electrode sections 21 are silicon carbide particles and silicon, main components of the electrode terminal projecting portions 22 are preferably also the silicon carbide particles and silicon. In this way, the electrode terminal projecting portions 22 contain the silicon carbide particles and silicon as the main components, whereby the components of the electrode sections 21 are the same as (or close to) the components of the electrode terminal projecting portions 22. Therefore, thermal expansion coefficients of the electrode sections 21 and the electrode terminal projecting portions 22 have the same value (or a close value). Moreover, a material of the electrode sections 21 and a material of the electrode terminal projecting portions 22 are the same (or close), and hence a joining strength between the electrode section 21 and the electrode terminal projecting portion 22 also increases. Therefore, even when heat stress is applied to the honeycomb structure, the electrode terminal projecting portion 22 can be prevented from being peeled from the electrode section 21, or a joining portion between the electrode terminal projecting portion 22 and the electrode section 21 can be prevented from being damaged. Here, when "the electrode terminal projecting portions 22 contain silicon carbide particles and silicon as main components", it is meant that the electrode terminal projecting portions 22 contain the silicon carbide particles and silicon as much as 90 mass % or more of the whole material. In particular, in two or more electrode bodies constituting the electrode section 21, components of the electrode body disposed in the uppermost layer (a second electrode body 31b in FIG. 10 to FIG. 12) are more preferably the same as (or close to) components of the electrode terminal projecting portions 22.

There is not any special restriction on a shape of the electrode terminal projecting portion 22, as long as the electrode terminal projecting portion can be joined to the electrode section 21 and the electric wiring line can be joined to the electrode terminal projecting portion. For example, as shown in FIG. 10 to FIG. 12, the electrode terminal projecting portion 22 preferably has the shape in which a columnar projection 22b is disposed on a rectangular plate-like substrate 22a. According to such a shape, the electrode terminal projecting portion 22 can firmly be joined to the electrode section 21 by the substrate 22a, and the electric wiring line can firmly be joined to the electrode terminal projecting portion by the projection 22b.

In the electrode terminal projecting portion 22, a thickness of the substrate 22a is preferably from 1 to 5 mm. With such a thickness of the substrate, the electrode terminal projecting portion 22 can firmly be joined to the electrode section 21. When the thickness is smaller than 1 mm, the substrate 22a weakens, and the projection 22b is easily detached from the substrate 22a. When the thickness is larger than 5 mm, a space where the honeycomb structure is to be disposed becomes larger than necessary sometimes.

Here, a length of the substrate 22a constituting the electrode terminal projecting portion 22 in "an outer peripheral direction in a cross section of the honeycomb structure section 4 which is perpendicular to the cell extending direction" is "a width of the substrate 22a". The width of the substrate 22a is preferably from 10 to 50%, and further preferably from 20 to 40% of a length of the electrode section 21 in "the outer peripheral direction (the direction along the outer periphery) in the cross section of the honeycomb structure section 4 which is perpendicular to the cell extending direction". In such a range of the width, the electrode terminal projecting portion 22 is not easily detached from the electrode section 21. When the percentage is smaller than 10%, the electrode terminal projecting portion 22 is easily detached form the electrode section 21 sometimes. When the percentage is larger than 50%, a mass increases sometimes. Moreover, in the electrode terminal projecting portion 22, a length of the substrate 22a in "an extending direction of cells 2" is preferably from 5 to 30% of the length of the honeycomb structure section 4 in the cell extending direction. With the result that the length of the substrate 22a in "the extending direction of the cells 2" is in such a range, a sufficient joining strength can be obtained. When the length of the substrate 22a in "the extending direction of the cells 2" is smaller than 5% of the length of the honeycomb structure section 4 in the cell extending direction, the substrate is easily detached from the electrode section 21 sometimes. Moreover, when the percentage is larger than 30%, the mass increases sometimes.

In the electrode terminal projecting portion 22, a thickness of the projection 22b is preferably from 3 to 15 mm. With such a thickness, the electric wiring line can firmly be joined to the projection 22b. When the thickness of the projection 22b is smaller than 3 mm, the projection 22b easily breaks sometimes. When the thickness of the projection 22b is larger than 15 mm, the electric wiring line is not easily connected sometimes. Moreover, a length of the projection 22b is preferably from 3 to 20 mm. With such a length, the electric wiring line can firmly be joined to the projection 22b. When the length is smaller than 3 mm, the electric wiring line is not easily joined sometimes. When the length is larger than 20 mm, the projection 22b easily breaks sometimes.

An electrical resistivity of the electrode terminal projecting portion 22 is preferably from 0.1 to 2.0 $\Omega$cm, and further preferably from 0.1 to 1.0 $\Omega$cm. With the result that the electrical resistivity of the electrode terminal projecting portion 22 is in such a range, a current can efficiently be supplied from the electrode terminal projecting portion 22 to the electrode section 21 in a piping line through which a high temperature exhaust gas flows. When the electrical resistivity of the electrode terminal projecting portion 22 is larger than 2.0 $\Omega$cm, the current does not easily flow, and hence the current is not easily supplied to the electrode section 21 sometimes.

A porosity of the electrode terminal projecting portion 22 is preferably from 30 to 45%, and further preferably from 30 to 40%. With the result that the porosity of the electrode terminal projecting portion 22 is in such a range, a suitable electrical resistivity can be obtained. When the porosity of the electrode terminal projecting portion 22 is higher than 45%, a strength of the electrode terminal projecting portion 22 deteriorates sometimes, and especially when a strength of the projection 22b deteriorates, the projection 22b easily breaks sometimes. The porosity is a value measured by a mercury porosimeter.

An average pore diameter of the electrode terminal projecting portion 22 is preferably from 5 to 20 µm, and further preferably from 7 to 15 µm. With the result that the average pore diameter of the electrode terminal projecting portion 22 is in such a range, a suitable electrical resistivity can be obtained. When the average pore diameter of the electrode terminal projecting portion 22 is larger than 20 µm, the strength of the electrode terminal projecting portion 22 deteriorates sometimes, and especially when the strength of the projection 22b deteriorates, the projection 22b easily breaks sometimes. The average pore diameter is a value measured by the mercury porosimeter.

When main components of the electrode terminal projecting portion 22 are silicon carbide particles and silicon, an average particle diameter of the silicon carbide particles contained in the electrode terminal projecting portion 22 is preferably from 10 to 60 µm, and further preferably from 20 to 60 µm. With the result that the average particle diameter of the silicon carbide particles contained in the electrode terminal projecting portion 22 is in such a range, the electrical resistivity of the electrode terminal projecting portion 22 can be from 0.1 to 2.0 $\Omega$cm. When the average particle diameter of the silicon carbide particles contained in the electrode terminal projecting portion 22 is smaller than 10 µm, the electrical resistivity of the electrode terminal projecting portion 22 excessively increases sometimes. When the average particle diameter of the silicon carbide particles contained in the electrode terminal projecting portion 22 is larger than 60 µm, the electrical resistivity of the electrode terminal projecting portion 22 excessively decreases sometimes. The average particle diameter of the silicon carbide particles contained in the electrode terminal projecting portion 22 is a value measured by a laser diffraction method.

A ratio of a mass of silicon contained in the electrode terminal projecting portion 22 to "a total of respective masses of the silicon carbide particles and silicon" contained in the electrode terminal projecting portion 22 is preferably from 20 to 40 mass %, and further preferably from 25 to 35 mass %.

With the result that the ratio of the mass of silicon to the total of the respective masses of the silicon carbide particles and silicon contained in the electrode terminal projecting portion 22 is in such a range, an electrical resistivity of 0.1 to 2.0 Ωcm can easily be obtained. When the ratio of the mass of silicon to the total of the respective masses of the silicon carbide particles and silicon contained in the electrode terminal projecting portion 22 is smaller than 20 mass %, the electrical resistivity excessively increases sometimes. Moreover, when the ratio is larger than 40 mass %, the electrode terminal projecting portion is deformed sometimes during manufacturing.

(2) Manufacturing Method of Honeycomb Structure:

Next, a manufacturing method of the honeycomb structure of the present invention will be described. There will be illustrated a method of manufacturing the honeycomb structure 300 (see FIG. 10 to FIG. 12) which is the still other embodiment of the honeycomb structure of the present invention described above.

First, metal silicon powder (metal silicon), a binder, a surfactant, a pore former, water and the like are added to silicon carbide powder (silicon carbide) to prepare a forming raw material. A ratio of a mass of metal silicon to a total of a mass of the silicon carbide powder and the mass of metal silicon is preferably from 10 to 40 mass %. An average particle diameter of silicon carbide particles in the silicon carbide powder is preferably from 3 to 50 μm, and further preferably from 3 to 40 μm. An average particle diameter of metal silicon (the metal silicon powder) is preferably from 2 to 35 μm. The average particle diameters of the silicon carbide particles and metal silicon (metal silicon particles) are values measured by a laser diffraction method. The silicon carbide particles are fine particles of silicon carbide constituting the silicon carbide powder, and the metal silicon particles are fine particles of metal silicon constituting the metal silicon powder. It is to be noted that this is a blend of the forming raw materials when the material of the honeycomb structure section is a silicon-silicon carbide composite material. When the material of the honeycomb structure section is silicon carbide, metal silicon is not added.

Examples of the binder include methylcellulose, hydroxypropyl methylcellulose, hydroxypropoxyl cellulose, hydroxyethylcellulose, carboxymethylcellulose, and polyvinyl alcohol. In these binders, methylcellulose and hydroxypropoxyl cellulose are preferably used together. A content of the binder is preferably from 2.0 to 10.0 parts by mass, when the total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or any combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pore former becomes pores after firing, and examples of the pore former include graphite, starch, resin balloons, a water-absorbing resin and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, a die is clogged sometimes during formation. The average particle diameter of the pore former is a value measured by a laser diffraction method.

Next, the forming raw material is kneaded to form a kneaded material. There is not any special restriction on a method of kneading the forming raw material to form the kneaded material, and an example of the method is a method using a kneader, a vacuum clay kneader or the like.

Next, a formed honeycomb body is formed by extrusion forming of the kneaded material. During the extrusion forming, a die having a desirable entire shape, cell shape, partition wall thickness, cell density or the like is preferably used. As a material of the die, a cemented carbide which does not easily wear down is preferable. The formed honeycomb body is a structure having partition walls to define and form a plurality of cells that become through channels of a fluid and an outer peripheral wall positioned in the outermost periphery.

A partition wall thickness, cell density, outer peripheral wall thickness and the like of the formed honeycomb body can suitably be determined in accordance with a structure of the honeycomb structure of the present invention which is to be prepared, in consideration of shrinkage at drying and firing.

The obtained formed honeycomb body is preferably dried. There is not any special restriction on a drying method, and examples of the method include an electromagnetic heating system such as microwave heating drying or high-frequency dielectric heating drying, and an external heating system such as hot air drying or superheat steam drying. In these methods, a method is preferable in which a predetermined amount of water content is dried by the electromagnetic heating system and then the remaining water content is dried by the external heating system, in that the whole formed body can rapidly and evenly be dried so that any cracks are not generated. As drying conditions, a water content of 30 to 99 mass % of an amount of the water content prior to the drying is preferably removed by the electromagnetic heating system, and then the water content is preferably decreased to 3 mass % or less by the external heating system. As the electromagnetic heating system, the dielectric heating drying is preferable, and as the external heating system, the hot air drying is preferable.

When a length of the formed honeycomb body in a central axis direction is not a desirable length, both end surfaces (both ends) of the formed honeycomb body are preferably cut so as to obtain the desirable length. There is not any special restriction on a cutting method, but an example of the method is a method using a round saw cutter or the like.

Next, there is prepared an electrode section forming raw material for forming an electrode section (specifically, electrode bodies constituting each electrode section). When main components of the electrode section are silicon carbide and silicon, the electrode section forming raw material is preferably formed by adding predetermined additives to silicon carbide powder and silicon powder, followed by kneading. The electrode section is formed by a laminated body of two or more electrode bodies, and hence for each electrode body to be laminated, components of the electrode body may be different components or the same components. Moreover, when the electrode section constituted of a central portion and an extended portion is formed, a central portion forming raw material and an extended portion forming raw material are prepared, respectively. When main components of the central portion are silicon carbide and silicon, the central portion forming raw material is preferably formed by adding predetermined additives to silicon carbide powder and silicon powder, followed by kneading. When the main components of the extended portion are silicon carbide and silicon, the extended portion forming raw material is preferably formed by adding predetermined additives to silicon carbide powder and silicon powder, followed by kneading.

Specifically, metal silicon powder (metal silicon), a binder, a surfactant, a pore former, water and the like are added to silicon carbide powder (silicon carbide), and kneaded to prepare the electrode section forming raw material. When a total mass of the silicon carbide powder and metal silicon is 100 parts by mass, the mass of metal silicon is preferably from 20 to 40 parts by mass. An average particle diameter of silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, an electrical resistivity excessively decreases sometimes. When the average particle diameter is larger than 20 μm, the electrical resistivity excessively increases sometimes. The average particle diameters of the silicon carbide particles and metal silicon (metal silicon particles) are values measured by the laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. In these binders, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or any combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pore former becomes pores after firing, and examples of the pore former include graphite, starch, resin balloons, a water-absorbing resin and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, large pores are easily formed, and strength deterioration is caused sometimes. The average particle diameter of the pore former is a value measured by the laser diffraction method.

Next, a mixture obtained by mixing silicon carbide powder (silicon carbide), metal silicon (metal silicon powder), a binder, a surfactant, a pore former, water and the like is preferably kneaded, to obtain an electrode section forming raw material in the form of a paste. There is not any special restriction on a kneading method, but, for example, a vertical type stirrer can be used.

Next, the obtained electrode section forming raw material is preferably applied to a side surface of the dried formed honeycomb body. There is not any special restriction on a method of applying the electrode section forming raw material to the side surface of the formed honeycomb body, but, for example, a printing method can be used. Moreover, the electrode section forming raw material is preferably applied to the side surface of the formed honeycomb body so as to obtain a shape and arrangement of the electrode sections in the honeycomb structure of the present invention described above. When the honeycomb structure of the present embodiment is manufactured, the above electrode section forming raw material is first applied to the side surface of the formed honeycomb body, to form a precursor of a first electrode body. Afterward, the electrode section forming raw material of the same components or different components is applied to the surface of the precursor of the first electrode body, to form a precursor of the other electrode body (e.g., a precursor of a second electrode body). When the electrode body is a laminated body of three or more layers, the electrode section forming raw material is preferably further applied, to form the precursor of the electrode body. It is to be noted that every time the electrode section forming raw material is applied to form the precursor of each electrode body, the applied electrode section forming raw material (the precursor of each electrode body) is preferably dried. For example, the precursor of the first electrode body is preferably formed, and then dried at 50 to 100° C. for about 30 minutes, to form the precursor of the next electrode body. "The precursor of the electrode body" is a non-fired electrode body that becomes the electrode body by the firing.

When the electrode section forming raw material is applied to the side surface of the formed honeycomb body, an area of the first electrode body (the area of the first electrode body after the firing) becomes larger than an area of the other electrode body (the area of the other electrode body after the firing). Furthermore, in at least one cross section perpendicular to a cell extending direction of the formed honeycomb body, a center angle of the first electrode body (the center angle of the first electrode body after the firing) becomes larger than a center angle of the other electrode body (the center angle of the other electrode body after the firing). Preferable examples of an outer peripheral shape of the electrode body include the outer peripheral shapes shown in FIG. 5A to FIG. 5G and FIG. 6A to FIG. 6E.

Thicknesses of the first electrode body and the other electrode body can be set to desirable thicknesses by regulating the thickness at the application of the electrode section forming raw material. In this way, the electrode section can be formed simply by applying the electrode section forming raw material to the side surface of the formed honeycomb body, followed by the drying and the firing, and hence the electrode section can very easily be formed.

Moreover, when the electrode section constituted of the central portion and the extended portion is formed, each of the central portion forming raw material and the extended portion forming raw material is preferably applied to the side surface of the dried formed honeycomb body. At this time, the respective raw materials are applied to the side surface of the formed honeycomb body so as to obtain such shapes of the central portion 21X and the extended portion 21Y of the electrode section 21 as shown in FIG. 13 and FIG. 14. There is not any special restriction on a method of applying the central portion forming raw material and the extended portion forming raw material to the side surface of the formed honeycomb body, and similarly to the case where the electrode section forming raw material is applied, for example, a printing method can be used.

Next, the electrode section forming raw material applied to the side surface of the formed honeycomb body is preferably dried (i.e., a precursor of the electrode section constituted of a laminated body of the precursors of the electrode bodies). In consequence, the formed honeycomb body to which the electrode section forming raw material is applied can be obtained. Drying conditions are preferably from 50 to 100° C. At this time, electrode terminal projecting portion forming members are not attached to the formed honeycomb body.

Next, the electrode terminal projecting portion forming members are preferably prepared. The electrode terminal projecting portion forming members are attached to the formed honeycomb body to become electrode terminal projecting portions. There is not any special restriction on a shape of the electrode terminal projecting portion forming members, but the members are preferably formed, for example, into such a shape as shown in FIG. 10 to FIG. 12. Moreover, the obtained electrode terminal projecting portion forming members are preferably attached to portions to which the electrode section forming raw material is applied (i.e., the precursors of the electrode bodies) in the formed honeycomb body to which the electrode section forming raw material is applied. It is to be noted that the order of the preparation of the formed honeycomb body, the blending of the electrode section forming raw material, and the preparation of the electrode terminal projecting portion forming members may be any order.

The electrode terminal projecting portion forming members are preferably obtained by forming and drying an electrode terminal projecting portion forming raw material. The electrode terminal projecting portion forming raw material is a raw material for forming the electrode terminal projecting portion forming members. When main components of the electrode terminal projecting portions are silicon carbide and silicon, the electrode terminal projecting portion forming raw material is preferably formed by adding predetermined additives to silicon carbide powder and silicon powder, followed by kneading.

Specifically, metal silicon powder (metal silicon), a binder, a surfactant, a pore former, water and the like are added to the silicon carbide powder (silicon carbide), and kneaded to prepare the electrode terminal projecting portion forming raw material. A ratio of a mass of metal silicon to a total of a mass of the silicon carbide powder and the mass of metal silicon is preferably from 20 to 40 mass %. An average particle diameter of silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, an electrical resistivity excessively decreases sometimes. When the average particle diameter is larger than 20 μm, the electrical resistivity excessively increases sometimes. The average particle diameters of the silicon carbide particles and metal silicon particles (metal silicon) are values measured by the laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. In these binders, methylcellulose and hydroxypropoxyl cellulose are preferably used together. A content of the binder is preferably from 2.0 to 10.0 parts by mass, when the total mass of the silicon carbide powder and the metal silicon powder is 100 parts by mass.

A content of the water is preferably from 20 to 40 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or any combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pore former becomes pores after firing, and examples of the pore former include graphite, starch, resin balloons, a water-absorbing resin and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, large pores are easily formed, and strength deterioration is caused sometimes. The average particle diameter of the pore former is a value measured by the laser diffraction method.

Next, a mixture obtained by mixing silicon carbide powder (silicon carbide), metal silicon (metal silicon powder), a binder, a surfactant, a pore former, water and the like is preferably kneaded, to obtain the electrode terminal projecting portion forming raw material. There is not any special restriction on a kneading method, but, for example, a kneader can be used.

There is not any special restriction on a method of forming the obtained electrode terminal projecting portion forming raw material into the shape of the electrode terminal projecting portion forming members, and an example of the method is a method of processing after the extrusion forming.

The electrode terminal projecting portion forming raw material is preferably formed into the shape of the electrode terminal projecting portion forming members, and then dried, to obtain the electrode terminal projecting portion forming members. Drying conditions are preferably from 50 to 100° C.

Next, the electrode terminal projecting portion forming members are preferably attached to the formed honeycomb body to which the electrode section forming raw material is applied. There is not any special restriction on a method of attaching the electrode terminal projecting portion forming members to the formed honeycomb body, but the electrode terminal projecting portion forming members are preferably attached to the formed honeycomb body by use of the above electrode section forming raw material. When the electrode terminal projecting portion forming members are attached, the electrode terminal projecting portion forming members are attached to the portions to which the electrode section forming raw material of the formed honeycomb body is applied. For example, the electrode section forming raw material is preferably applied to "the surface" of the electrode terminal projecting portion forming member "which comes in contact with the formed honeycomb body", and the electrode terminal projecting portion forming member is preferably attached to the formed honeycomb body so that "the surface to which the electrode section forming raw material is applied" comes in contact with the formed honeycomb body.

Then, "the formed honeycomb body to which the electrode section forming raw material is applied and the electrode terminal projecting portion forming members are attached" is preferably dried and fired, to obtain the honeycomb structure of the present invention. It is to be noted that when the one embodiment (the honeycomb structure 100 (see FIG. 1 to FIG. 4)) of the honeycomb structure of the present invention is prepared, the above dried "formed honeycomb body to which the electrode section forming raw material is applied (the electrode terminal projecting portion forming members are not attached)" may be subjected to a treatment such as the firing by the following method. The treatment such as the firing is a calcinating, the firing, an oxidation treatment or the like.

Drying conditions at this time are preferably from 50 to 100° C.

Moreover, the calcinating is preferably performed to remove the binder and the like prior to the firing. The calcinating is preferably performed at 400 to 500° C. in the air atmosphere for 0.5 to 20 hours. There is not any special restriction on calcinating and firing methods, and the firing can be performed by using an electric furnace, a gas furnace or the like. As firing conditions, heating is preferably performed at 1400 to 1500° C. in an inert atmosphere of nitrogen, argon or the like for one to 20 hours. Moreover, after the firing, an oxygenation treatment is preferably performed at 1200 to 1350° C. for one to ten hours, to enhance a durability.

It is to be noted that the electrode terminal projecting portion forming members may be attached prior to the firing of the formed honeycomb body, or may be attached after the firing. When the electrode terminal projecting portion forming members are attached to the formed honeycomb body after the firing of the formed honeycomb body, the firing is preferably thereafter performed on the above conditions again.

EXAMPLES

Hereinafter, the present invention will further specifically be described in accordance with examples, but the present invention is not limited to any of these examples.

Example 1

First, silicon carbide (SiC) powder and metal silicon (Si) powder were mixed at a mass ratio of 80:20. To this mixture, hydroxypropyl methylcellulose as a binder and a water-absorbing resin as a pore former were added, and water was also added, to prepare a forming raw material. Next, this forming raw material was kneaded by a vacuum clay kneader, to prepare a columnar kneaded material. A content of the binder was 7 parts by mass when a total of the silicon carbide (SiC) powder and the metal silicon (Si) powder was 100 parts by mass. A content of the pore former was 3 parts by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 20 µm, and an average particle diameter of the metal silicon powder was 6 µm. Moreover, an average particle diameter of the pore former was 20 µm. The average particle diameters of silicon carbide, metal silicon and the pore former are values measured by a laser diffraction method.

The obtained columnar kneaded material was formed by using an extrusion forming machine, to obtain a formed honeycomb body. The obtained formed honeycomb body was dried by high-frequency dielectric heating, and then dried at 120° C. for two hours by use of a hot air drier, and both end surfaces of the formed honeycomb body were cut as much as a predetermined amount.

Next, silicon carbide (SIC) powder and metal silicon (Si) powder were mixed at a mass ratio of 60:40. To this mixture, hydroxypropyl methylcellulose as a binder, glycerin as a moisture retaining agent and a surfactant as a dispersant were added, and water was also added and mixed. The mixture was kneaded to obtain an electrode section forming raw material. A content of the binder was 0.5 part by mass when a total of the silicon carbide (SiC) powder and the metal silicon (Si) powder was 100 parts by mass. A content of glycerin was 10 parts by mass when the total of the silicon carbide (SiC) powder and the metal silicon (Si) powder was 100 parts by mass. A content of the surfactant was 0.3 part by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 52 µm, and an average particle diameter of the metal silicon powder was 6 µm. The average particle diameters of silicon carbide and metal silicon are values measured by the laser diffraction method. The kneading was performed by a vertical type stirrer.

Next, the electrode section forming raw material was applied to the side surface of the dried formed honeycomb body in a band-like shape so that a thickness was 0.25 mm and a width of an outer peripheral shape was 80 mm. "The thickness" of the above-mentioned applied electrode section forming raw material was "the thickness" after the electrode section forming raw material was dried and fired. Moreover, the above "width of the outer peripheral shape" was "a length" of the dried and fired electrode section forming raw material in a peripheral direction of a honeycomb structure section. The electrode section forming raw material was applied to two portions of the side surface of the dried formed honeycomb body. Moreover, in a cross section perpendicular to a cell extending direction, one of the two portions to which the electrode section forming raw material was applied was disposed on a side opposite to the other portion via the center of the formed honeycomb body. In this way, a precursor of a first electrode body was formed on the side surface of the formed honeycomb body. An outer peripheral shape of the precursor of the first electrode body applied to the side surface of the formed honeycomb body was a rectangular shape.

Next, the electrode section forming raw material was applied to the surface of the precursor of each dried first electrode body in a band-like shape so that a thickness was 0.25 mm and a width of an outer peripheral shape was 12 mm. "The thickness" of the applied electrode section forming raw material was "the thickness" after the electrode section forming raw material was dried and fired. Moreover, the above "width of the outer peripheral shape" was "a length" of the dried and fired electrode section forming raw material in the peripheral direction of the honeycomb structure section. In this way, a precursor of a second electrode body was formed on the formed honeycomb body. An outer peripheral shape of the precursor of the second electrode body was a rectangular shape. In the present example, a pair of electrode sections were formed of a laminated body in which this precursor of the first electrode body and the precursor of the second electrode body were laminated.

Next, the electrode section forming raw material applied to the formed honeycomb body (the laminated body of the precursors of the electrode bodies) was further dried. Drying conditions were 120° C.

Next, silicon carbide (SiC) powder and metal silicon (Si) powder were mixed at a mass ratio of 60:40. To this mixture, hydroxypropyl methylcellulose as a binder was added, and water was also added, and mixed. The mixture was kneaded to obtain an electrode terminal projecting portion forming raw material. The electrode terminal projecting portion forming raw material was kneaded by using a vacuum clay kneader to obtain a kneaded material. A content of the binder was 4 parts by mass when a total of the silicon carbide (SiC) powder and the metal silicon (Si) powder was 100 parts by mass. A content of the water was 22 parts by mass when the total of the silicon carbide (SiC) powder and the metal silicon (Si) powder was 100 parts by mass. An average particle diameter of the silicon carbide powder was 52 μm, and an average particle diameter of the metal silicon powder was 6 μm. The average particle diameters of silicon carbide and metal silicon are values measured by the laser diffraction method.

The obtained kneaded material was processed into a form as in the electrode terminal projecting portion 22 shown in FIG. 10 to FIG. 12 (a form constituted of a substrate and a projection), and dried, to obtain an electrode terminal projecting portion forming member. Moreover, drying conditions were 70° C. A portion corresponding to the plate-like substrate 22a had a size of "3 mm×12 mm×15 mm". Furthermore, a portion corresponding to the projection 22b was formed into a columnar shape in which a diameter of a bottom surface was 7 mm and a length in a central axis direction was 10 mm. The two electrode terminal projecting portion forming members were prepared.

Next, each of the two electrode terminal projecting portion forming members was attached to each of two portions of the formed honeycomb body to which the electrode section forming raw material was applied. The electrode terminal projecting portion forming member was attached to the portion of the formed honeycomb body to which the electrode section forming raw material was applied, by use of the electrode section forming raw material. Thereafter, "the formed honeycomb body to which the electrode section forming raw material was applied and the electrode terminal projecting portion forming members were attached" was degreased, fired, and further subjected to an oxidation treatment to obtain a honeycomb structure. Degreasing conditions were 550° C. and three hours. Firing conditions were 1450° C. and two hours in an argon atmosphere. Conditions of the oxidation treatment were 1300° C. and one hour.

An average pore diameter of partition walls of the obtained honeycomb structure was 8.6 μm, and a porosity was 45%. The average pore diameter and porosity are values measured by a mercury porosimeter. As the mercury porosimeter, trade name "Autopore IV9505" manufactured by Micromeritics Co. was used. Moreover, a partition wall thickness of the honeycomb structure was 101.6 μm, and a cell density was 93 cells/cm$^2$. Furthermore, the bottom surface of the honeycomb structure had a round shape with a diameter of 93 mm, and a length of the honeycomb structure in the cell extending direction was 100 mm. Additionally, a ratio of a center angle of the second electrode body to a center angle of the first electrode body (hereinafter also referred to as "the center angle ratio") was 15%. An electrical resistivity of the first electrode body was 5 Ωcm, and an electrical resistivity of the second electrode body was 1.3 Ωcm. A ratio of the electrical resistivity of the second electrode body to the electrical resistivity of the first electrode body (hereinafter also referred to as "the electrical resistivity ratio") was 26%. An electrical resistivity of the honeycomb structure section was 40 Ωcm, and an electrical resistivity of the electrode terminal projecting portion was 0.8 Ωcm.

Moreover, the electrical resistivities of the honeycomb structure section, and the first electrode body, the second electrode body and the electrode terminal projecting portion constituting each electrode section were measured by the following method. First, a test piece of 10 mm×10 mm×50 mm was prepared by using the same material as in a measurement target. That is, when the electrical resistivity of the honeycomb structure section was measured, the test piece was prepared by using the same material as in the honeycomb structure section. When the electrical resistivity of each electrode body was measured, the test piece was prepared by using the same material as in each electrode body. Moreover, when the electrical resistivity of the electrode terminal projecting portion was measured, the test piece was prepared by using the same material as in the electrode terminal projecting portion. A silver paste was applied to the whole surfaces of both ends of the test piece (both the ends in a longitudinal direction), and a wiring line was connected so as to enable energization. The test piece was connected to a voltage applying current measuring device, and a voltage was applied to the test piece. A thermocouple was disposed in a central portion of the test piece, and a change of a temperature of the test piece with elapse of time at the application of the voltage was confirmed by a recorder. A voltage of 100 to 200 V was applied to the test piece, and a current value and a voltage value in a state where the temperature of the test piece was 400° C. were measured, to calculate the electrical resistivity from the obtained current value, voltage value and test piece dimension.

"The maximum temperature" of the obtained honeycomb structure was measured by the following method. The results are shown in Table 1.

(Maximum Temperature)

There were measured temperatures of "a position where the end of the electrode section (the end in the peripheral direction) came in contact and a position where the central point of the electrode section in the peripheral direction came in contact in the cross section perpendicular to the cell extending direction" of the honeycomb structure section, when a voltage of 200 V was applied to the obtained honeycomb structure. In the measured temperatures, the highest temperature was the maximum temperature. One of the position where the end of the electrode section (the end in the peripheral direction) came in contact and the position where the central point of the electrode section in the peripheral direction came in contact in the honeycomb structure section was a position where a current flowed most as well as a portion of the highest temperature in the honeycomb structure. The position (a temperature measuring position) in a gas flow direction was the center.

TABLE 1

|  | Width of electrode body (mm) | | Center angle ratio (%) | Thickness of electrode body (mm) | | Electrical resistivity of electrode body (Ωcm) | | Electrical resistivity ratio (%) | Max. temp. (° C.) |
|---|---|---|---|---|---|---|---|---|---|
|  | First electrode body | Second electrode body |  | First electrode body | Second electrode body | First electrode body | Second electrode body |  |  |
| Example 1 | 80 | 12 | 15 | 0.25 | 0.25 | 5 | 1.3 | 26 | 148 |
| Example 2 | 80 | 20 | 25 | 0.25 | 0.25 | 5 | 1.3 | 26 | 141 |
| Example 3 | 80 | 30 | 38 | 0.25 | 0.25 | 5 | 1.3 | 26 | 122 |
| Example 4 | 80 | 40 | 50 | 0.25 | 0.25 | 5 | 1.3 | 26 | 108 |
| Example 5 | 80 | 50 | 63 | 0.25 | 0.25 | 5 | 1.3 | 26 | 107 |
| Example 6 | 80 | 60 | 75 | 0.25 | 0.25 | 5 | 1.3 | 26 | 107 |
| Example 7 | 80 | 70 | 88 | 0.25 | 0.25 | 5 | 1.3 | 26 | 117 |
| Example 8 | 80 | 76 | 95 | 0.25 | 0.25 | 5 | 1.3 | 26 | 137 |
| Example 9 | 80 | 60 | 75 | 0.25 | 0.25 | 5 | 0.25 | 5 | 113 |
| Example 10 | 80 | 60 | 75 | 0.25 | 0.25 | 5 | 0.5 | 10 | 109 |
| Example 11 | 80 | 60 | 75 | 0.25 | 0.25 | 5 | 1.3 | 26 | 107 |
| Example 12 | 80 | 60 | 75 | 0.25 | 0.25 | 5 | 2.5 | 50 | 103 |
| Example 13 | 80 | 60 | 75 | 0.25 | 0.25 | 5 | 3.5 | 70 | 104 |
| Example 14 | 80 | 60 | 75 | 0.25 | 0.25 | 5 | 4.5 | 90 | 106 |
| Example 15 | 80 | 60 | 75 | 0.25 | 0.25 | 5 | 5 | 100 | 122 |
| Example 16 | 80 | 4 | 5 | 0.25 | 0.25 | 5 | 1.3 | 26 | 156 |
| Comparative Example 1 | 80 | — | 0 | 0.25 | — | 5 | — | — | 168 |
| Comparative Example 2 | 80 | 80 | 100 | 0.25 | 0.25 | 5 | 1.3 | 26 | 165 |

Examples 2 to 16 and Comparative Examples 1 and 2

Honeycomb structures were prepared in the same manner as in Example 1, except that widths, thicknesses and electrical resistivities of a first electrode body and a second electrode body of each honeycomb structure were changed as shown in Table 1. "The maximum temperature" of the honeycomb structure was measured in the same manner as in Example 1. In Comparative Example 1, any second electrode body was not formed, and the only first electrode body was an electrode section.

It is seen from Table 1 that in the honeycomb structures of Examples 1 to 16, "the maximum temperature" is low, whereas in the honeycomb structures of the comparative examples, "the maximum temperature" is very high.

INDUSTRIAL APPLICABILITY

A honeycomb structure of the present invention can suitably be utilized as a catalyst carrier for an exhaust gas purifying device which purifies an exhaust gas of a car. Description of Reference Numerals 1: partition wall, 2: cell, 3: outer peripheral wall, 4: honeycomb structure section, 5: side surface, 11: one end surface, 12: other end surface, 21: electrode section, 21a: one end of the electrode section, 21b: other end of the electrode section, 22: electrode terminal projecting portion, 22a: substrate, 22b: projection, 23: conductor, 31: electrode body, 31a: electrode body (first electrode body), 31b: electrode body (other electrode body or second electrode body), 100, 200, 300 and 400: honeycomb structure, O: center, P and Q: line segment, α: center angle, β: angle formed by line segment P and line segment Q, and θ: angle of 0.5 time as much as the center angle.

The invention claimed is:

1. A honeycomb structure comprising a tubular honeycomb structure section having porous partition walls to define and form a plurality of cells extending from one end surface to the other end surface to become through channels of a fluid, and an outer peripheral wall positioned in the outermost periphery; and a pair of electrode sections disposed on a side surface of the honeycomb structure section, wherein an electrical resistivity of the honeycomb structure section is from 1 to 200 Ωcm, each of the pair of electrode sections is formed into a band shape extending in a cell extending direction of the honeycomb structure section, and each of the pair of electrode sections is constituted of two or more electrode bodies laminated in a diametric direction in a cross section perpendicular to the cell extending direction of the honeycomb structure section, in the cross section perpendicular to the cell extending direction, the one electrode section in the pair of electrode sections is disposed on a side opposite to the other electrode section in the pair of electrode sections via the center of the honeycomb structure section, and when in the respective two or more electrode bodies constituting each of the electrode sections in the pair of electrode sections, the electrode body of each electrode section which is disposed closest to a side of the outer peripheral wall is a first electrode body, an area of the first electrode body of each electrode section in the side surface of the honeycomb structure section is larger than an area of the other electrode body in the two or more electrode bodies of each electrode section, and in at least one cross section perpendicular to the cell extending direction, a center angle of the first electrode body of each electrode section is larger than a center angle of the other electrode body in the two or more electrode bodies of each electrode section.

2. The honeycomb structure according to claim 1, wherein in the at least one cross section perpendicular to the cell extending direction, the center angle of the other electrode body of each electrode section is an angle corresponding to 5 to 95% of the center angle of the first electrode body of each electrode section.

3. The honeycomb structure according to claim 1,
wherein in a range of 50 to 100% of a length of the pair of electrode sections in the cell extending direction, the center angle of the first electrode body of each electrode section is larger than the center angle of the other electrode body of each electrode section.

4. The honeycomb structure according to claim 2,
wherein in a range of 50 to 100% of a length of the pair of electrode sections in the cell extending direction, the center angle of the first electrode body of each electrode section is larger than the center angle of the other electrode body of each electrode section.

5. The honeycomb structure according to claim 1,
wherein in all the cross sections of the pair of electrode sections in the cell extending direction, the center angle of the first electrode body of each electrode section is larger than the center angle of the other electrode body of each electrode section.

6. The honeycomb structure according to claim 2,
wherein in all the cross sections of the pair of electrode sections in the cell extending direction, the center angle of the first electrode body of each electrode section is larger than the center angle of the other electrode body of each electrode section.

7. The honeycomb structure according to claim 3,
wherein in all the cross sections of the pair of electrode sections in the cell extending direction, the center angle of the first electrode body of each electrode section is larger than the center angle of the other electrode body of each electrode section.

8. The honeycomb structure according to claim 1,
wherein the electrical resistivity of the other electrode body of each electrode section is a value corresponding to 5 to 100% of the electrical resistivity of the first electrode body of each electrode section.

9. The honeycomb structure according to claim 2,
wherein the electrical resistivity of the other electrode body of each electrode section is a value corresponding to 5 to 100% of the electrical resistivity of the first electrode body of each electrode section.

10. The honeycomb structure according to claim 3,
wherein the electrical resistivity of the other electrode body of each electrode section is a value corresponding to 5 to 100% of the electrical resistivity of the first electrode body of each electrode section.

11. The honeycomb structure according to claim 4,
wherein the electrical resistivity of the other electrode body of each electrode section is a value corresponding to 5 to 100% of the electrical resistivity of the first electrode body of each electrode section.

12. The honeycomb structure according to claim 1,
wherein a thickness of the other electrode body of each electrode section is a thickness corresponding to 50 to 150% of a thickness of the first electrode body of each electrode section.

13. The honeycomb structure according to claim 2,
wherein a thickness of the other electrode body of each electrode section is a thickness corresponding to 50 to 150% of a thickness of the first electrode body of each electrode section.

14. The honeycomb structure according to claim 3,
wherein a thickness of the other electrode body of each electrode section is a thickness corresponding to 50 to 150% of a thickness of the first electrode body of each electrode section.

15. The honeycomb structure according to claim 4,
wherein a thickness of the other electrode body of each electrode section is a thickness corresponding to 50 to 150% of a thickness of the first electrode body of each electrode section.

16. The honeycomb structure according to claim 5,
wherein a thickness of the other electrode body of each electrode section is a thickness corresponding to 50 to 150% of a thickness of the first electrode body of each electrode section.

* * * * *